US008591605B2

(12) United States Patent
Misra et al.

(10) Patent No.: US 8,591,605 B2
(45) Date of Patent: Nov. 26, 2013

(54) METHODS, SYSTEMS, AND APPARATUS FOR OBTAINING BIOFUEL FROM COFFEE AND FUELS PRODUCED THEREFROM

(75) Inventors: Manoranjan Misra, Reno, NV (US); Susanta Kumar Mohapatra, Lexington, KY (US); Narasimharao V. Kondamudi, Reno, NV (US)

(73) Assignee: Board of Regents of the Nevada System of Higher Education, on behalf of the University of Nevada, Reno, Reno, NV (US)

( * ) Notice: Subject to any disclaimer, the term of this patent is extended or adjusted under 35 U.S.C. 154(b) by 355 days.

(21) Appl. No.: 12/669,958

(22) PCT Filed: Jul. 25, 2008

(86) PCT No.: PCT/US2008/071236
§ 371 (c)(1),
(2), (4) Date: Jul. 7, 2010

(87) PCT Pub. No.: WO2009/015358
PCT Pub. Date: Jan. 29, 2009

(65) Prior Publication Data
US 2010/0287823 A1    Nov. 18, 2010

Related U.S. Application Data

(60) Provisional application No. 60/952,175, filed on Jul. 26, 2007, provisional application No. 61/034,012, filed on Mar. 5, 2008.

(51) Int. Cl.
*C10L 1/18*    (2006.01)
(52) U.S. Cl.
USPC ............................................. 44/307; 44/388

(58) Field of Classification Search
USPC .................................................... 44/307, 388
See application file for complete search history.

(56) References Cited

U.S. PATENT DOCUMENTS 2,680,687 A * 6/1954 Lemonnier ................... 426/386
3,354,188 A   11/1967 Bock et al.
(Continued)

FOREIGN PATENT DOCUMENTS

KR    10-2007-0041518 A    4/2007
WO    WO 92/11266    7/1992

OTHER PUBLICATIONS

Balasundram, et al., Phenolic compounds in plants and agri-industrial by-products: Antioxidant activity, occurrence, and potential uses, Food Chemistry 99, 2006, 191-203.

(Continued)

*Primary Examiner* — Cephia D Toomer
(74) *Attorney, Agent, or Firm* — Ryan A. Heck; UNR-DRI Technology Transfer Office

(57) ABSTRACT

In some embodiments, the present disclosure provides a method for producing biofuel from a feedstock that includes one or more coffee sources, such as green coffee beans, whole roasted coffee beans, ground coffee, or spent coffee grounds. Triglycerides and other materials, such as antioxidants, are extracted from the coffee source. In some example, the triglycerides are then transesterified to produce a fatty acid ester biofuel product. In further examples, the method includes obtaining spent coffee grounds from one or more sources, such as residences or businesses that generate spent coffee grounds. The present disclosure also provides biofuels produced using the disclosed method, including mixtures of such biofuels with other fuels, such as other biofuels or petroleum based fuels. Materials obtained from the disclosed method may be put to other uses, such as cosmetics, medicinal products, food products, or combustible materials.

21 Claims, 20 Drawing Sheets

(56) References Cited

U.S. PATENT DOCUMENTS

| | | | |
|---|---|---|---|
| 3,704,132 A | 11/1972 | Strobel | |
| 4,156,031 A | 5/1979 | Hamell et al. | |
| 4,229,562 A | 10/1980 | Rogier | |
| 4,323,514 A | 4/1982 | Dieffenbacher | |
| 4,328,255 A * | 5/1982 | Roselius et al. | 426/417 |
| 4,409,253 A | 10/1983 | Morrison, Jr. et al. | |
| 4,446,162 A | 5/1984 | Malizia et al. | |
| 4,544,567 A | 10/1985 | Gottesman | |
| 4,617,177 A | 10/1986 | Schumacher | |
| 4,659,577 A | 4/1987 | Meinhold et al. | |
| 4,748,258 A | 5/1988 | Bertholet | |
| 5,059,703 A | 10/1991 | Piotrowski et al. | |
| 5,236,729 A | 8/1993 | Schlecht et al. | |
| 5,350,879 A | 9/1994 | Engel et al. | |
| 5,424,420 A | 6/1995 | Hasenhuettl et al. | |
| 5,539,135 A | 7/1996 | Breuer et al. | |
| 5,576,044 A | 11/1996 | Chmiel et al. | |
| 5,714,094 A | 2/1998 | Bertholet et al. | |
| 5,888,549 A | 3/1999 | Buchholz et al. | |
| 5,908,946 A | 6/1999 | Stern et al. | |
| 5,910,454 A | 6/1999 | Sprules | |
| 6,033,706 A | 3/2000 | Silkeberg et al. | |
| 6,113,662 A | 9/2000 | Sprules | |
| 6,538,146 B2 | 3/2003 | Turck | |
| 6,793,697 B2 | 9/2004 | Sprules et al. | |
| 7,138,536 B2 | 11/2006 | Bournay et al. | |
| 7,241,321 B2 | 7/2007 | Murica | |
| 7,312,355 B2 | 12/2007 | Corma Cannos et al. | |
| 7,897,798 B2 * | 3/2011 | McNeff et al. | 554/170 |
| 2005/0274065 A1 | 12/2005 | Portnoff et al. | |
| 2006/0094890 A1 | 5/2006 | Sharma et al. | |
| 2006/0201056 A1 * | 9/2006 | Jordan | 44/307 |
| 2007/0066838 A1 | 3/2007 | Hillion et al. | |
| 2007/0083056 A1 | 4/2007 | Srinivas et al. | |
| 2007/0231243 A1 | 10/2007 | Eisgruber et al. | |
| 2007/0232817 A1 | 10/2007 | Pereira et al. | |
| 2007/0260078 A1 | 11/2007 | Bhat et al. | |
| 2007/0282118 A1 | 12/2007 | Gupta et al. | |
| 2007/0283619 A1 | 12/2007 | Hillion et al. | |
| 2008/0021232 A1 | 1/2008 | Lin et al. | |

OTHER PUBLICATIONS

Balat, Production of biodiesel from vegetable oils: a survey, Energy Sources, Part A: Recovery, Utilization and Environmental Effects, 2007, 895-913, 29:10.

Barakos, et al., Transesterification of triglycerides in high and low quality oil feeds over an HT2 hydrotalcite catalyst, Bioresour. Technol., Jul. 2008, 5037-42, 99(11).

Batch Solvent Extraction and Desolventising Unit brochure, Armfield, FT29, issue 3.

Bengis, et al., The chemistry of the coffee-bean, The Journal of Biological Chemistry, 1932, 99-113, vol. XCVII, No. I.

Billingham, et al., Solubility of phenolic antioxidants in polyolefins, J of Applied Polymer Sci., 1981, 3543-3555, vol. 26.

Biodiesel—clean burning alternative fuel recipes from vegetable oil, http://www.angelfire.com/mi3/gmpr/gmrprbiodiesel.htm, accessed Jul. 12, 2007.

Bortolamasi, et al., Design and sizing of screw feeders, PARTEC, 2001, Nuremberg, Germany.

"Building a Successful Biodiesel Business . . . " Google Book Search (1 pg).

Coffee Fair Trade Sugar Scrub website, htt;://www.body-systems.net/spa.php?item=39&ret=http%3A%2F . . . , accessed Feb. 12, 2008.

Calzada, et al., Biogas production from coffee pulp juice using packed reactors: scale-up experiments, MIRCEN Journal, 1986, 489-492, vol. 2.

Camargos, et al., On the feasibility of producing biodiesel from defective coffee beans, ASAE Meeting Presentation, 2005, Paper No. 056140.

Cammerer, et al., Antioxidant activity of coffee brews, Eur. Food Res Technol., 2006, 469-474, 223.

Del Castillo, et al., Effect of roasting on the antioxidant activity of coffee brews, J. Agric. Food Chem., 2002, 3698-3703, 50.

Climent, et al., Chemicals from biomass derived products: synthesis of polyoxyethyleneglycol esters from fatty acid methyl esters with solid basic catalysts, Green Chem., 2006, 524-532, 8.

"Coffee—what a pleasure!" . . . positively coffee, Newsletter from the International Coffee Organization, Spring 2007.

Controlling Coffee Quality Using Laser Diffraction, 2006, Mastersizer 2000 application note, Malvern Instruments, MRK781-01.

Demirbas, Recent developments in biodiesel fuels, Int'l J. of Green Energy, 2007, 15-26, vol. 4, Issue 1.

Di Serio, et al., Transesterification of soybean oil to biodiesel by using heterogeneous basic catalysts, 2006, 3009-3014, vol. 45, No. 9.

Diserio, et al., From homogeneous to heterogeneous catalysts in biodiesel production, Ind. Eng. Chem. Res., 2007, 6379-6384, 46(20).

Dupas, et al., Coffee antioxidant properties: effects of milk addition and processing conditions, 2006, J. Food Sci., 253-258, vol. 71, No. 3.

Extraction of oils from oilseeds by accelerated solvent extraction (ASE), Application Note 325, Dionex.

"Feasibility Report Small Scale Biodiesel Production," WMRC.

Hou, et al., Lewis acid-catalyzed transesterification and esterification of high FFA oil in subcritical methanol, Korean J. of Chem. Eng., Mar. 2007, 311-313, vol. 24, No. 2.

Hydrotalcite, Mineral Data Publishing, version 1.

Hydrotalcite Mineral Data web page, http://webmineral.com/data/Hydrotalcite.shtml, accessed Jul. 15, 2008 (5 pg).

Hydrotalcite mineral information and data web page, http://www.mindat.org/min-1987.html, accessed Jul. 15, 2008 (1 pg).

Ilgen, et al., Investigation of biodiesel production from canola oil using Mg-Al hydrotalcite catalysts, Turk. J. Chem., 2007, 509-514, 31.

Kang, et al., Layered double hydroxide and its anion exchange capacity, J. of Materials Online, Sep. 2005, also published in print form in Advances in Technology of Materials and Materials Processing, 2004, 218-223, vol. 6, No. 2.

Kim, Development of nano-hydrotalcites for biodiesel synthesis, Wayne State Univ. College of Eng., 2007, http://www.eng.wayne.edu/page.php?id=4958, accessed Jul. 15, 2008.

Kinast, Production of biodiesels from multiple feedstocks and properties of biodiesels and biodiesel/diesel blends, NREL, Mar. 2003, NREL/SR-510-31460.

Knothe, et al., Cetane numbers of branched and straight-chain fatty esters determined in an ignition quality tester, Fuel, 2003, 971-975, 82.

Kusdiana, et al., Biodiesel fuel for diesel fuel substitute prepared by a catalyst-free supercritical methanol, Jan. 2002, conference paper.

Leclercq, et al., Transesterification of rapeseed oil in the presence of basic zeolites and related solid catalysts, 2001, JAOCS, 1161-1165, vol. 78, No. 11.

Lei, et al., Highly crystalline activated layered double hydroxides as solid acid-base catalysts, AIChE Journal, 2006, http://www3.interscience.wiley.com/journal/114123685/abstract?CRE . . . , accessed Jul. 15, 2008 (2 pg).

Liu, et al., Transesterification of poultry lipids using Mg-Al hydrotalcite derived catalysts, 2006, http://aiche.confex.com/aiche/2006/preliminaryprogram/abstract_65331.htm, accessed Jul. 15, 2008 (1 pg).

Lotero, et al., Triglyceride transesterification using solid base catalysts, Dept. Chem. & Biomolecular Eng., Clemson University, Clemson, SC, 29634 (US).

Marchetti, et al., Possible methods for biodiesel production, Renewable and Sustainable Energy Reviews, 2007, 1300-1311, 11.

"Material Safety Data Sheet" for Captex 1000, ABITEC, Jul. 13, 2005.

McCormick, et al., Survey of the quality and stability of biodiesl and biodiesel blends in the United States in 2004, NREL Technical Report, Oct. 2005, NREL/TP-540-38836.

(56) References Cited

OTHER PUBLICATIONS

Meher, et al., Technical aspects of biodiesel production by transesterification—a review, Renewable and Sustainable Energy Reviews, Jun. 2006, 248-268, vol. 10, Issue 3.

Naczk, et al., Phenolics in cereals, fruits and vegetables: occurrence, extraction and analysis, J. or Pharm. and Biomed. Analysis, 2006, 1523-2542, 41.

Noureddini, et al., Glycerolysis of fats and methyl esters, Chemical and Biomolecular Engineering Research and Publications, papers in Biomaterials, 1997, University of Nebraska, Lincoln.

Park, International Search Report and Written Opinion, PCT/US/2008/071236, Jan. 29, 2009.

Prankl, et al., Technical performance of vegetable oil methyl esters with a high iodine number, 4th Biomass Conference of the Americas, 1999, Oakland, CA, USA (6 pg).

Rachmaniah, et al., Abstract: A study on acid-catalyzed transesterification of crude rice bran oil for biodiesel production.

Ramalakshmi, et al., Physicochemical characteristics of green coffee: comparison of graded and defective beans, J of Food Sci., 2007, 333-337, vol. 72, No. 5.

Ribeiro, et al., The role of additives for diesel and diesel blended (ethanol or biodiesel) fuels: a review, Energy & Fuels, 2007, 2433-2445, vol. 21, Issue 4.

Schuchardt, et al., Transesterification of vegetable oils: a review, J. Braz. Chem. Soc., 1998, 199-210, vol. 9, No. 1.

Solid/Liquid Extraction Unit brochure, Armfield, UOP4MkII, issue 3.

Stalmach, et al., On-line HPLC analysis of the antioxident activity of phenolic compounds in brewed, paper-filtered coffee, Braz. J. Plant Physiol., 2006, 253-262, vol. 18, No. 1.

Svilaas, et al., Intakes of antioxidants in coffee, wine, and vegetables are correlated with plasma carotenoids in humans, J. of Nutrition, Mar. 2004, 562-567, vol. 134, Issue 3.

Tube Coffee Latte Lip Balm website, http://www.body-systems.net/spa.php?item=290&ret=http%3A%2F%2 . . . , accessed Feb. 12, 2008.

Tyson, Biodiesel technology and feedstocks, NREL, Mar. 2003, Biodiesel for New England, Eastern Connecticut State Univ.

Viswanathan, et al., Selection of solid heterogeneous catalysts for transesterification reaction, Chem. Ind. Dig., 2008, 91-99, 21.

Wikipedia, Biodiesel production, http://en.wikipedia.org/w/index.php?title=Biodiesel_production &printable . . . , accessed Jul. 5, 2007 (6 pg).

Wikipedia, Layered double hydroxides, http://en.wikipedia.org/w/index.php?title=Layered_double-hy-droxides&p . . . , accessed. Jul. 15, 2008 (2 pg).

"Biodiesel conversion using ultrasonication (1 Tank)" web page, http://www.hielscher.com.image/Biodiesel_1_Tank_p0500.gif, accessed Feb. 12, 2008 (1 pg).

"Biodiesel & SVO Discussion Forums" web page, http://biodiesel.infopop.cc/eve/forums/a/tpc/f/7396055 5l/m/1321070231, accessed Feb. 12, 2008 (5 pgs).

Dalai, et al., Biodiesel productions from vegetable oils using heterogeneous catalysts and their applications as lubricity additives, EIC Climate Change Technology, 2006, IEEE.

Hielscher-Ultrasound Technology web page, "Biodiesel conversion using ultrasonication," http://www.hielscher.com/image/Biodiesel_Continuos_p1000.gif, accessed Feb. 18, 2008 (1 pg).

Hielscher-Ultrasound Technology web page, "Biodiesel from algae using ultrasonication," http://www.hielscher.com/ultrasonics/algae_extraction_01.htm, accessed Feb. 12, 2008 (2 pg).

Hielscher-Ultrasound Technology web page, "Ultrasonic transesterification of oil to biodiesel," http://www.hielscher.com/ultrasonics/biodiesel_transesterification_01.htm., accessed Feb. 12, 2008 (7 pg).

Hielscher-Ultrasound Technology web page, "Ultrasonication and renewable fuels," http://www.hielscher.com/ultrasonics/renewable_fuels_01.htm, accessed Feb. 12, 2008 (2 pg).

Mazzocchia, et al., Fatty acid methyl esters synthesis from triglycerides over heterogeneous catalysts in presence of microwaves, C.R. Chimie, 2004, 601-605, 7.

Reddy, et al., Room-temperature conversion of soybean oil and poultry fat to biodiesel catalyzed by nanocrystalline calcium oxides, Energy & Fuels, 2006, 1310-1314, vol. 20.

Sercheli, et al., Alkylguanidine-catalyzed heterogeneous transesterification of soybean oil, JAOCS, 1999, 1207-1210, No. 10.

Shay, National biodiesel surge creates bittersweet co-product with glycerol, renewableenergyaccess.com, Dec. 3, 2007, accessed Feb. 12, 2008 (4 pg).

Singh, et al., Reaction kinetics of soybean oil transesterification using heterogeneous metal oxide catalysts, Chem. Eng. Technol., 2007 1716-1720, 30, No. 12.

Srinivas, et al., Silica chloride: a versatile heterogeneous catalyst for esterification and transesterification, Synthesis, Aug. 2003, 2479-2482, No. 16.

Wei, et al., Synthesis of dimethyl carbonate by transesterification over CaO/carbon composites, Green Chemistry, Apr. 29, 2003, 343-346, vol. 5.

Wei, et al., Preparation of Ca-based solid base catalyst and its application for DMC synthesis from methanol and propylene carbonate, 18th NACS Mtg., Jun. 6, 2003, ENV-036.

Wikipedia, "Glycerol" web page, http://en.wikipedia.org/w/index.php?Glycerol&printable=yes, accessed Dec. 12, 2008 (4 pg).

Xie, et al., Synthesis of biodiesel from soybean oil using heterogeneous KF/ZnO catalyst, Catalysis Letters, Feb. 2006, 53-59, vol. 107, Nos. 1-2.

\* cited by examiner

METHODS, SYSTEMS, AND APPARATUS FOR OBTAINING BIOFUEL FROM COFFEE AND FUELS PRODUCED THEREFROM

CROSS REFERENCE TO RELATED APPLICATIONS

This is the U.S. National Stage of International Application No. PCT/US2008/071236, filed Jul. 25, 2008, which was published in English under PCT Article 21(2), which in turn claims the benefit of, and incorporates by reference, U.S. Provisional Patent Application No. 60/952,175, filed Jul. 26, 2007, and U.S. Provisional Patent Application No. 61/034,012, filed Mar. 5, 2008.

FIELD

This disclosure relates generally to biofuels and other materials produced from coffee, and methods, systems, and apparatus for producing such biofuels and materials. In particular embodiments, such biofuels are produced from roasted coffee, such as from coffee grounds.

BACKGROUND

While it is mainly used for beverages, coffee is the focus of substantial cultivation and production. According to June 2006 figures of the United States Department of Agriculture, the world's coffee production is 16.34 billion pounds per year. That amount is currently increasing.

Raw coffee beans contain about 20 wt % triglycerides. There have been some reports of attempts to obtain biofuel, such as biodiesel, from low quality coffee beans. However, it appears that these attempts are using traditional methods to process the whole, green coffee beans. Such methods can suffer from a number of disadvantages.

Biofuels from raw crops are typically produced by mechanically pressing the source material to extract triglycerides. The triglycerides are then hydrolyzed to produce fatty acids. The fatty acids are then esterified, typically using lower alcohols such, as methanol or ethanol.

Mechanical extraction can produce limited yields of triglycerides, particularly when the source material is large or coarse. In addition, mechanical extraction can also extract impurities, which can reduce the quality of the resulting biofuel or require purification steps, which can increase the cost of producing the biodiesel or reduce the overall yield.

Typical biofuels can suffer from a number of disadvantages. For example, many biofuels are not stable, such as being stable for less than 24 hours. This lack of stability may limit adoption of biofuels due to concerns about engine fouling or storage container fouling by degraded fuel. Distribution also may be an issue with unstable fuels, as they may not be transportable, or transported only short distances, before they degrade.

Attempts have been made to stabilize biofuels by adding various additives to the biofuel. For example, some studies have attempted to extend the time before the biodiesel degrades by incorporating various additives into the fuel, such as synthetic phenolic antioxidants. However, many biofuels with such additives are still only stable for about 30 days or less. Additive addition also may increase the cost of the fuel, making it less attractive compared with conventional petroleum-based fuels, or create other concerns, such for engine performance or emissions.

SUMMARY

The present disclosure provides methods, systems, and apparatus for producing biofuels from coffee and provides fuels produced using such methods, systems, and apparatus. Triglycerides and other materials, such as antioxidants, are extracted from coffee, such as from green coffee beans, whole roasted coffee beans, ground coffee, or spent coffee grounds. In some implementations, the triglycerides and other materials are obtained by mechanically pressing the coffee. In further implementations, triglycerides and other materials are chemically extracted from the coffee, such as with one or more organic solvents. In yet further implementations, the triglycerides are obtained by distillation of the coffee.

In one specific embodiment, triglycerides are extracted from water-extracted coffee, such as from spent coffee grounds obtained from a conventional hot-water brewing process, using one or more organic solvents. Suitable organic solvents include, but are not limited to, lower alkyl solvents or mixtures thereof, such as hexane or petroleum ether, ethers, such as diethyl ether, halogenated solvents, such as chloroform, or dichloromethane, or solvent mixtures which include one or more of such solvents, including mixtures with alcohols, such as methanol or ethanol. The solvent is removed, such as by distillation, to produce a triglyceride product.

The triglyceride product is then transesterified, such as using a lower aliphatic alcohol, often methanol or ethanol. Transesterification may be accomplished by any suitable process, such as base, acid or catalyzed transesterification, alkoxide transesterification, enzyme catalyzed processes, or transesterification using supercritical alcohols. In a particular embodiment, base catalyzed transesterification or alkoxide catalyzed transesterification is used with anhydrous methanol to produce glycerol and methyl fatty acid esters.

Biofuels produced according to the disclosed methods can be subjected to one or more treatment steps to improve the quality of the resulting biofuel. For example, the pH of the biofuel is at least substantially neutralized in some embodiments, such as adjusting the pH to about 6.5 to about 7.5 or about 7.0. Adjustment of pH can be accomplished, for example, by washing the biofuel with a weakly acidic solution for basic or alkoxide transesterification or washing with a weakly basic or neutral solution for acidic transesterification.

Some biofuels produced according to the disclosed methods have a relatively high concentration of unsaturated fatty acid esters. In particular embodiments, the biofuels have a concentration of unsaturated fatty acid esters of at least about 20 vol %, such as at least about 30 vol %, at least about 40 vol %, or at least 50 vol %.

In some embodiments, biofuels produced using the disclosed methods have a comparatively high concentration of antioxidants. For example, in various examples the concentration of antioxidants in the biofuel is between about 0.5 wt % to about 20 wt %, such as about 1 wt % to about 15 wt %, such as about 1 wt % to about 10 wt %, about 3 wt % to about 8 wt %, or about 2 wt % to about 5 wt %. In further examples, the biofuel includes at least about 2 wt %, 5 wt %, 8 wt %, or 10 wt % antioxidants. In some examples, the antioxidants comprise one or more of chlorogenic acid, caffeic acid, 5-hydroxytryptamides of long chain fatty acids (such as arachidic, behenic, and lignoceric), N-methylpyridinium, phenolic acids, polyphenols, melanoidins, quinines, and tetraoxygenated phenylindans. In some aspects, fuels produced using a disclosed method comprise a sufficient amount of antioxidant to at least substantially inhibit oxidation of the biofuel for a desired period, such as at least about 30 days, such as at least about 90 days.

In further embodiments, antioxidant rich biofuels produced using the methods of the present disclosure are blended with fuels from other sources, including biofuels from other sources, in order to stabilize such biofuels. For example, the antioxidant rich biofuel can be added to biofuels from sources such as vegetables, grains, seeds, algae, nuts, and animal fat. In various examples, a biofuel mixture includes from about 0.1 wt % to about 50 wt % of antioxidant rich biofuel according to the present disclosure, such as between about 0.2 wt % and about 10 wt % or between about 0.2 wt % and about 5 wt %.

In another aspect, the present disclosure provides for the use of antioxidant-containing coffee extracts, such as coffee oil or fatty acid esters produced therefrom, in other applications, such as in cosmetic, medicinal products, or food products. The present disclosure also provides materials thus produced.

Further embodiments relate to extracting antioxidants from roasted coffee. In some implementations, the antioxidants are obtained by subjecting a solvent extract of one of the coffee sources described above, such as spent coffee grounds, to column chromatography. In specific examples, the antioxidants obtained from such methods are added to biofuels, such as biofuels produced from conventional sources such as animal fats and plant oils. In particular examples, the antioxidants are added to the conventional biofuel in an amount effective to reduce oxidation, such as between about 0.2 wt % and about 10 wt % or between about 0.2 wt % and about 5 wt %. Antioxidants can be used for other applications, such as in cosmetic, medicinal products, or food products.

In particular embodiments, biofuels are obtained from roasted coffee, such as roasted coffee beans, ground roasted coffee, or spent coffee grounds. Obtaining biofuels from roasted coffee can result in biofuels with increased antioxidant levels relative to green coffee, as roasting can convert antioxidant precursors to antioxidants. Accordingly, biofuels prepared from roasted coffee may have larger amounts of antioxidants than biofuels prepared from green, unroasted coffee. In addition, obtaining biofuels from already roasted coffee may eliminate roasting steps during processing the coffee in to biofuel, potentially simplifying the production process and making the process less expensive to operate.

In more particular embodiments, biofuels are produced from water-extracted coffee, such as spent coffee grounds. Water extraction can remove nitrogen-containing compounds, such as caffeine, and other materials from coffee. Removing of such materials can result in a cleaner biofuel. Further, using spent grounds can obviate roasting, grinding, and water-extracting the coffee, thus potentially producing biofuel at a lower cost and simplifying processing. However, some disclosed embodiments can include roasting, grinding, or extracting coffee prior to biofuel production.

In specific implementations, coffee beans are ground or otherwise comminuted prior to use for biofuel production. Grinding can provide a higher surface area material, which can increase the efficiency of oil extraction from coffee, thus improving biofuel yield.

The present disclosure also provides methods and systems for obtaining coffee for use in biofuel production, production of biofuel therefrom, and distribution of the resultant biofuel. For example, a biofuel production apparatus is provided that is capable of producing biofuels at a particular rate. Depending on the rate of biofuel production of the apparatus, a needed amount of coffee input is determined. A sufficient amount of coffee sources, such as households, coffee shops, hotels, restaurants, and businesses are identified that will supply the needed amount of coffee input. Coffee is collected from the coffee sources, transported to the biofuel production apparatus, processed into biofuel, and the resultant biofuel collected for distribution to fuel consumers, such as automobiles. In a specific example, a relatively large producer of coffee, such as spent coffee grounds, such as a coffee shop, is provided with a biofuel production apparatus capable of producing biofuel from coffee according to methods of the present disclosure. In further implementations, the coffee biofuel production apparatus or system is located in or adjacent an apparatus or system for production of a biofuel from a non-coffee source, such as a conventional biofuel source.

The present disclosure also provides apparatus for producing biofuels from coffee. In one example, such device includes a triglyceride extraction unit, such as a solvent extraction unit or a dry distillation unit. The device also includes a transesterification unit and solvent recovery unit, such as for recovering excess methanol used in the transesterification.

The present disclosure also provides systems and methods for producing combustible materials from processed spent coffee grounds. In a particular implementation, glycerin produced from the formation of fatty acid esters from coffee oil is combined with processed spent coffee grounds and compressed to form a combustible solid product. The solid product can include additional materials, such as to aid in combustion, or to increase the aesthetic properties of the combustible product.

In another aspect, the present disclosure provides methods for transesterifying an oil, such as coffee oil, using a solid catalyst and ultrasonication. In a specific example, the catalyst is calcium oxide, such as commercial grade calcium oxide. In another example, the solid catalyst is a double layer hydroxide or an oxide or mixed oxide-hydroxide precursor of such materials. In more particular example, the material is hydrotalcite, quintinite, or the oxide or mixed oxide-hydroxide precursors thereof.

There are additional features and advantages of the subject matter described herein. They will become apparent as this specification proceeds.

In this regard, it is to be understood that this is a brief summary of varying aspects of the subject matter described herein. The various features described in this section and below for various embodiments may be used in combination or separately. Any particular embodiment need not provide all features noted above, nor solve all problems or address all issues in the prior art noted above.

BRIEF DESCRIPTION OF THE DRAWINGS

Various embodiments are shown and described in connection with the following drawings in which.

DETAILED DESCRIPTION

Unless otherwise explained, all technical and scientific terms used herein have the same meaning as commonly understood by one of ordinary skill in the art to which this disclosure belongs. The singular terms "a," "an," and "the" include plural referents unless the context clearly indicates otherwise. Similarly, the word "or" is intended to include "and" unless the context clearly indicates otherwise. The term "includes" means "comprises." The terms "solvent," "a solvent" and "the solvent" include one or more than one individual solvent compound unless indicated otherwise. Mixing solvents that include more than one individual solvent compound with other materials can include mixing the individual solvent compounds simultaneously or serially unless indicated otherwise. The separations and extractions described herein can be partial, substantial or complete separations unless indicated otherwise. All percentages recited herein are weight percentages unless indicated otherwise. All numerical ranges given herein include all values, including end values (unless specifically excluded) and intermediate ranges.

Figure 1:
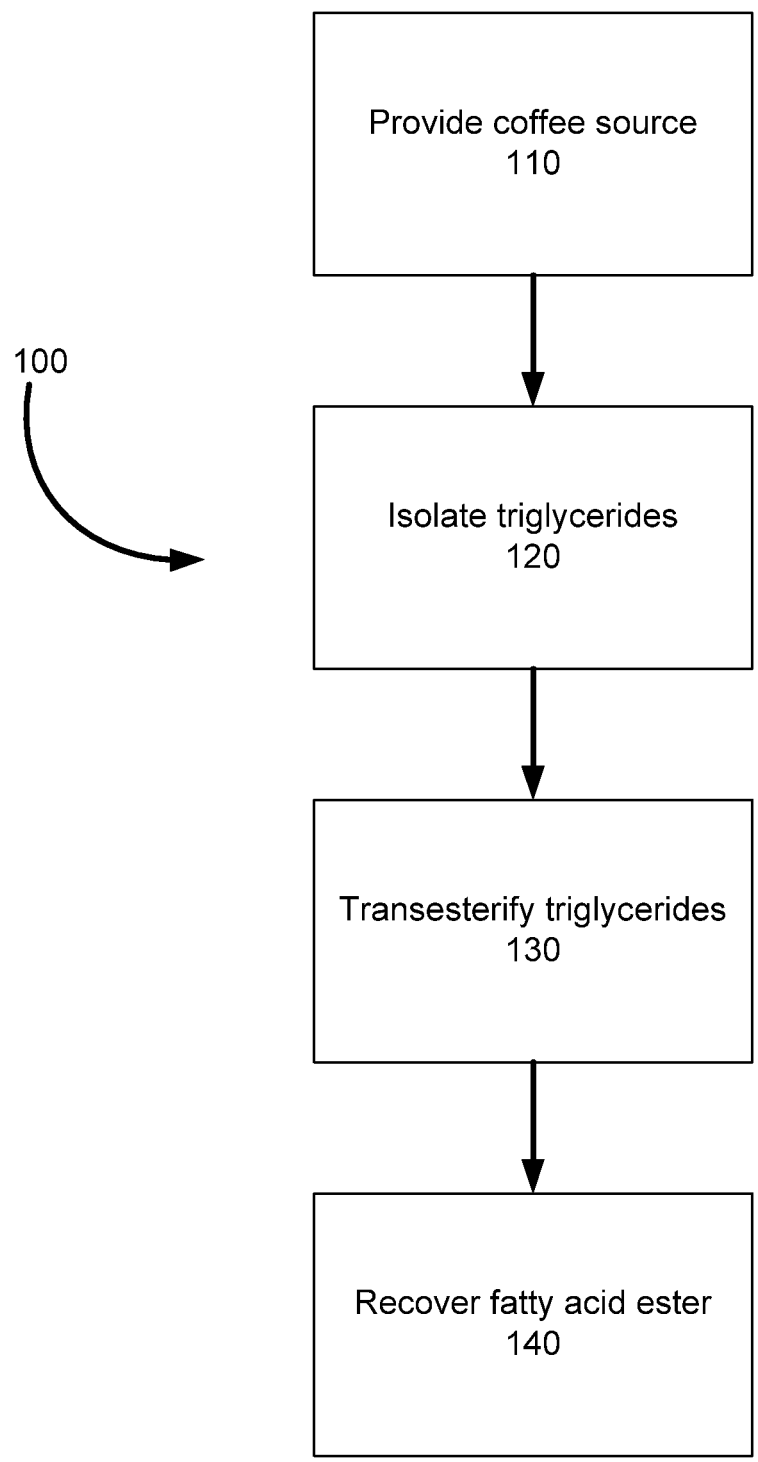
FIG. 1 is a schematic flow diagram illustrating one disclosed embodiment of a process for obtaining fatty acid esters from coffee.

FIG. 1 illustrates a general method 100 for obtaining biofuel from coffee. In the method 100, a coffee source is provided in step 110. Triglycerides are isolated from the coffee in step 120. In step 130, the triglycerides are transesterified. Fatty acid esters, which may be used as biofuel, are recovered in step 140.

Figure 2:
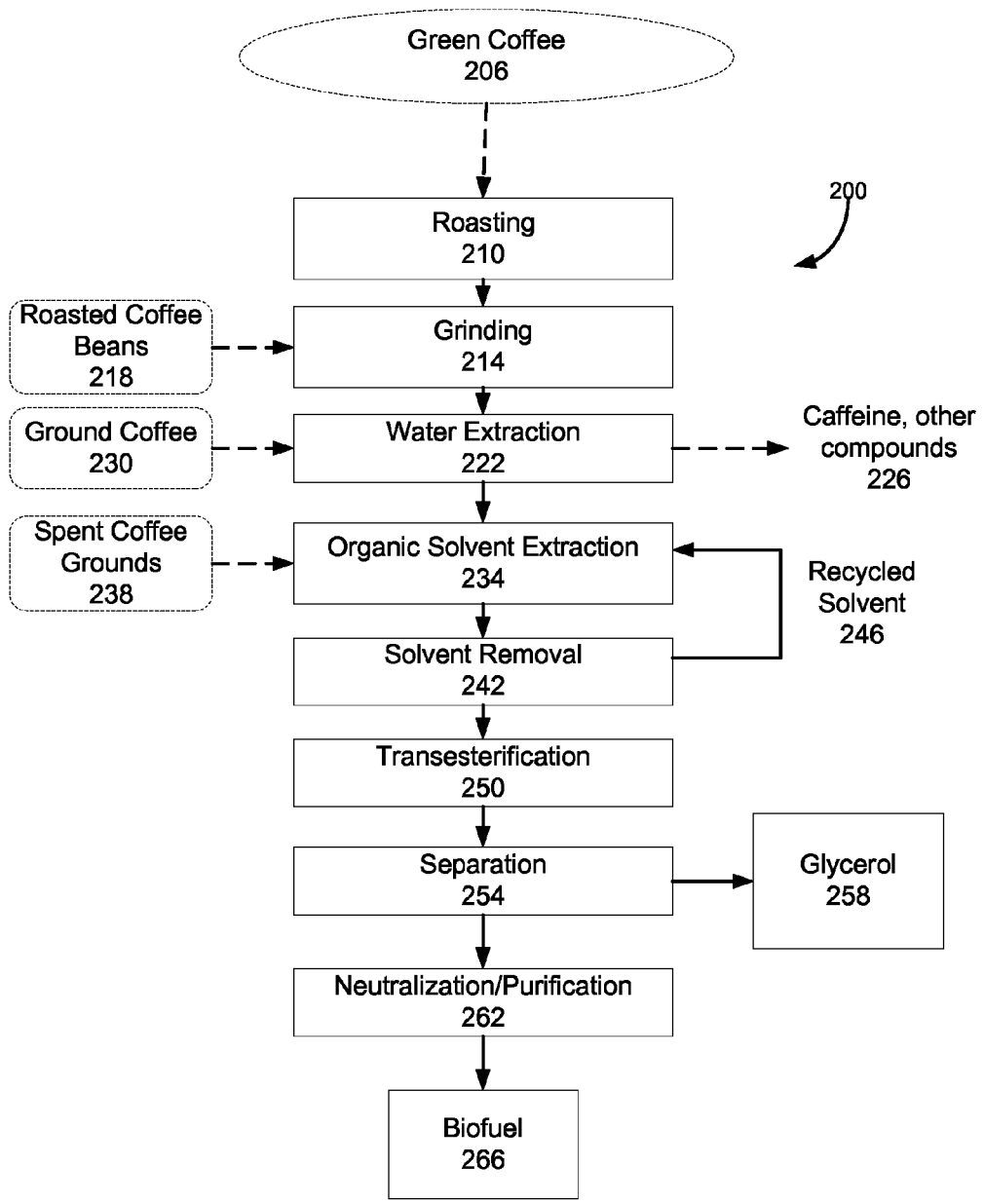
FIG. 2 is a schematic flow diagram illustrating one disclosed embodiment of a process for obtaining fatty acid esters from various coffee sources.

FIG. 2 illustrates an embodiment of a method 200 according to the present disclosure for producing biofuels, such as biodiesel, from one or more coffee sources. In one optional step, green coffee 206 is obtained and roasted in a roasting process 210. Roasting may take place in a batch or continuous process and typically occurs at a temperature of about 200° C. to about 500° C. Roasting is carried out until the coffee 206 achieves a desired roast level, typically between about 1 minute and about 20 minutes, such as between about 4 minutes and about 12 minutes.

When roasting coffee for use in beverage purposes, the roast level is typically determined by the color of the roasted coffee bean or by various physical changes the beans undergo during the roasting process. For example, a cinnamon roast is a very light roast while half-city, city, and full city roasts are progressively darker. Full city+, French, and espresso roasts are darker roasts. When physical characteristics are used to judge roast level two common benchmarks are the "first crack" and "second crack" undergone by coffee beans as they are roasted, and gas evolution causes expansion of the bean and cracking of the shell.

These roast level gradations can also be used when roasting coffee for use in biofuel production. Coffee beans naturally contain substantial amounts of antioxidants. Coffee beans also contain substantial amounts of antioxidant precursors, which are converted to antioxidants during the roasting process. In some examples, coffee 206 is roasted to a medium roast. In particular implementations, coffee is roasted to a level such that internal coffee oils are not volatilized to the exterior surface of the beans. Although exterior oils can be recovered during subsequent extraction, they can coat surfaces of process apparatus and potentially interfere with subsequent processing or increase maintenance costs.

Coffee beans are known to contain a number of antioxidants, including chlorogenic acid, caffeic acid, 5-hydroxytryptamides of long chain fatty acids (such as arachidic, behenic, and lignoceric), N-methylpyridinium, phenolic acids, polyphenols, melanoidins, quinines, and tetraoxygenated phenylindans. The structures of certain antioxidants found in coffee are described in Stalmach et al., *Braz. J. Plant Physiol.*, 18(1), 253-262 (2006), incorporated by reference herein. While the exact composition and quantity of antioxidants can vary, such as based on the particular coffee being used and its roasting conditions, such antioxidants are generally present in an amount between about 0.5 wt % to about 20 wt %, such as about 1 wt % to about 15%, such as about 1 wt % to about 10 wt % or about 3 wt % to about 8 wt %. In some embodiments, the coffee is selected, or roasting conditions selected, to produce coffee having a desired type and quantity of antioxidants.

After roasting in step 210, the coffee is ground, pulverized, or otherwise comminuted in step 214. Grinding may occur by any suitable process, such as a burr grinder, a conical burr grinder, and a blade grinder. Hammer mills may also be used to comminute the coffee. The coffee may be ground to various sizes, which may depend on the process requirements of a particular production system or apparatus. Typically, the mean particle size of the ground coffee is between about 5 microns and about 5,000 microns, such as between about 10 microns and about 1,500 microns, or between about 100 microns and 1,000 microns. However, larger particle sizes can be used, if desired.

Generally, smaller particle sizes provide more efficient extraction of triglycerides and antioxidants than larger sizes. However, particles which are too small may make processing, such as filtering or separating a solvent from the grounds, more difficult. In some implementations, the ground coffee is passed through a screen in order to produce more uniform particle sizes, or otherwise sorted into particle sizes or particle size ranges. In some examples, the screen is about 5 to about 60 mesh, such as about 15 to about 40 mesh.

As shown in FIG. 2, roasted coffee beans 218 are optionally provided to the system 200 without first being roasted in step 210. These beans 218 may be, for example, low quality, spoiled, stale, or coffee beans 118 otherwise unused for other purposes, such as beverage production. Obtaining pre-roasted coffee beans 218 may result in lower biofuel production costs as the roasting step 210 may be omitted.

In step 222, the ground coffee from step 214 is extracted with water. Typically, hot water is used, such as water at a temperature of between about 15° C. and about 100° C., such as between about 80° C. and about 98° C. However, in some embodiments, hotter extraction temperatures can be used, such as using heated steam, or extraction with supercritical fluids. Typically, longer extraction times are used with lower extraction temperatures.

Water extraction can take place as a batch or continuous process. The water or steam is allowed to contact the ground coffee for a sufficient time to allow extraction to occur. In some embodiments, the water and coffee are mixed together for a period of between about 30 seconds to about 72 hours, such as between about 1 minute and about 10 minutes or between about 1 minute and about 6 minutes. Extraction time may depend on a number of factors, including the particle size of the coffee, the temperature of the water or steam used for extraction, and the desired level of extraction.

Extraction typically removes a number of compounds 226 from the coffee grounds, including caffeine and other nitrogen-containing compounds. Removing such materials from the grounds can be beneficial, as the water soluble components removed during water extraction will not be present, or will be present to a lesser extent, in the final biofuel product. The lack of such compounds in the final fuel can produce a fuel with improved properties.

As shown in FIG. 2, in some embodiments, roasted, ground coffee 230 is provided to the system 200 without first being roasted in step 210 or ground in step 214. These grounds 230 may be, for example, low quality, spoiled, stale, or coffee grounds 230 otherwise unused for other purposes, such as beverage production. Obtaining pre-roasted, ground coffee 230 may result in lower biofuel production costs as the roasting and grinding steps 210, 214 may be omitted.

Although not shown in FIG. 2, water can be removed from the brewed coffee 226. In particular implementations, this water is recycled back into the extraction step 222 or used elsewhere in the system. For example, the water can be removed by freeze drying, distillation, or passage through a membrane. Heater exchangers (not shown) can be used to recycle energy in the system 200.

Triglycerides, antioxidants, and other components are extracted from the water-extracted coffee grounds in step 234. Typically, an organic solvent is used to extract the triglycerides. Typical solvents include alcohols, often lower alkyl alcohols, such as methanol, ethanol, and isopropanol, hydrocarbons or hydrocarbon mixtures, such as paraffinic hydrocarbons having 4-8 carbons, such as hexane and petroleum ether, halogenated solvents, often halogenated lower alkyl compounds, such as dichloromethane and chloroform, ethers, such as diethyl ether, aldehydes and ketones, such as methyl ethyl ketone and acetone, and mixtures thereof.

In some methods, the solvent is selected to extract particular components of interest. For example, relatively nonpolar solvents may be used to extract triglycerides, yet avoid extraction of water and other materials. Nonpolar solvents may also extract fewer acidic components, such as free fatty acids. Triglycerides thus obtained may require fewer processing steps, such as neutralization. Polar solvents, in some examples, are better able to extract antioxidants from the coffee oil.

Extraction can occur in a batch or continuous process. Suitable continuous processes include countercurrent extraction processes using one or more of the above-disclosed solvents and an auger for conveying the ground coffee. One such continuous extraction system is disclosed in U.S. Pat. No. 4,617,177, incorporated by reference herein. Other suitable extraction devices include Soxhlet extractors. In one particular example of a batch process, solvent is mixed with the coffee grounds and then filtered. The extraction can be carried out at a lower than ambient, or higher than ambient temperature. In some examples, the coffee is refluxed with solvent for a period of time, such as between about 30 minutes and about 24 hours, such as between about 1 hour and about 8 hours. In a particular example, the mixture is refluxed for about 1 hour.

Although the method 200 has been described as extracting triglycerides from coffee, the triglycerides can be obtained by other means in further embodiments. The triglycerides are obtained by mechanical methods, as in known in the art, in some examples, such as by pressing. The triglycerides may also be obtained by heating the coffee source, as described further below.

In some implementations, all or part of the coffee used in the system 100 is obtained from spent coffee grounds 238. Spent coffee grounds 238 can be obtained from numerous sources, including commercial coffee beverage production facilities (such as those which produce canned or bottled coffee beverages), commercial operations which produce coffee-flavored foods, coffee shops, restaurants, convenience stores, businesses, and other establishments. Spent coffee grounds 238 are also collected, in some configurations, from end consumers, such as from residences, such as homes and apartments. For example, coffee grounds can be collected along with other materials such as garbage and recycling.

Collecting spent coffee grounds 238 can provide numerous advantages in the biofuel production system 200. For example, using spent coffee grounds 238 saves such coffee grounds from taking up space in landfills or being dumped into drains and instead provides useful products. Further, using spent coffee grounds eliminates or reduces the need to perform others processes of the system 200, such as roasting 210, grinding 214, and water extraction 222. Although some variability in coffee grounds 238 may result from obtaining materials from different sources, such as different particle sizes, roasts, and coffee types, this is likely to have a fairly negligible effect on the overall process 200. Some steps, such as screening or further grinding, could still be performed, if desired. Eliminating one or more of steps 210, 214, 222 can reduce the complexity of the system 200, and devices incorporating such system, and decrease the energy and materials costs of building or operating the system 200, as well as reducing wastes and other system byproducts. In addition, elimination of such steps can reduce the size of devices used to carry out the process 200.

Using spent grounds may facilitate triglyceride removal, as the brewing process may precondition triglycerides for removal. For example, the brewing process may start the extraction process, such as moving the triglycerides towards the surface of the coffee grounds. Such preconditioning may have one or more advantages, such as reducing the time needed to extract the triglycerides, reducing the extraction temperature, using less solvent, or providing a higher triglyceride yield.

It is expected that many sources of spent coffee grounds 238 would provide the material for free, or at a negligible cost, as it is a material which is typically disposed of anyway. If desired, sources of spent coffee grounds 238 can be compensated for providing the material. In further embodiments, significant producers of spent coffee grounds, such as coffee shops, may operate a system 200 in order to provide additional revenues streams as well as to project an environmentally positive image.

Regardless of the source of water-extracted coffee, it can be beneficial, in some embodiments, to extract the triglycerides shortly after the coffee is obtained. For example, triglycerides can oxidize upon extended exposure to air, which can interfere with subsequent transesterification.

After solvent extraction 234, solvent is removed in step 242. Solvent removal may be accomplished by any suitable method. For example, the solvent may be distilled from the desired product. In particular implementations, solvent removal 242 occurs under reduced pressure, such as under a full or partial vacuum, in order to reduce the temperature at which the solvent boils, and thus the heat energy needed to volatilize the solvent. In more particular implementations, rotary evaporators or similar devices are used to remove solvent. When mixed solvent systems are used, fractional distillation can be performed and suitable distillation columns incorporated into the solvent removal step 242 in order to aid separation of the different solvent components. Fractional distillation can also be used to purify the triglyceride material or to separate the triglycerides from other components, such as free fatty acids. Of course, if mixed recovery of solvents is not of concern, fractional distillation need not be performed.

Solvent 246 obtained from solvent removal in process 242 can be recycled into other parts of the system 200, such as into the solvent extraction process 234. Appropriate choice of solvents and operating conditions can result in substantial reuse of the solvent, decreasing materials costs and potentially environmentally harmful waste products. In some embodiments, over 85% of the solvent used in step 234 is recovered in step 242, such as over 95%.

The triglyceride material obtained from process 142 can be subjected to further processing steps prior to transesterification. For example, the triglyceride can be washed to remove free fatty acids and other materials. In some embodiments, the wash is carried out with an alcohol, such as methanol or ethanol, or an organic acid, such as acetic acid. Multiple washings can increase the amount of free fatty acid removed, thus increasing the pH towards neutral. In some embodiments, the triglyceride is washed until the pH is sufficiently neutral, such as to a pH of about 6.7 or more. Particularly when water sensitive materials are used in the subsequent transesterification step, the triglyceride material can be dried, such as using molecular sieves or similar materials, such as zeolites, silica gels, or acidic clays, or other drying agents, such as sodium sulfate, calcium chloride, magnesium sulfate, potassium carbonate, and calcium sulfate. If needed or desired, the pH of the triglycerides can be adjusted, such as to a pH of about 6.5 to about 7.5 or about 7.0, using standard methods, such as addition of an acid or base. The triglycerides can be further purified or fractionated, such as using distillation, as described in U.S. Pat. No. 3,704,132, incorporated by reference herein.

After solvent removal step 242, and any other desired processing steps, a coffee oil is obtained which contains triglycerides, antioxidants, and other materials. The triglycerides are converted to esters, useable as biofuel, in a transesterification process 250. The transesterification process 250 may operate according to any suitable transesterification method. For example, a number of acid and base catalysts are disclosed in U.S. Pat. No. 5,424,420 and in Schuchardt et al., *J. Braz. Chem. Soc.*, 9(1), 199-210 (1998), each of which is incorporated by reference herein.

In typical transesterification reactions, an alcohol containing the desired substituent group is added to the coffee oil. Such alcohols can be represented by R'—OH, where R' is the desired group use to form the ester, $RCO_2R'$. Suitable alcohols include lower alkyl alcohols, such as $C_1$-$C_4$ alcohols, which may be linear or branched. In more particular examples, the alcohol is methanol or ethanol. Alcohol is typically used in a stoichiometric excess, such as at a ratio of alcohol-to-triglyceride of between about 3:1 and about 40:1, such as about 6:1 to about 12:1 or between about 9:1 and about 12:1. In a specific example, the ratio of alcohol to triglyceride is about 9:1. In further examples, the transesterification mixture includes from about 20% to about 60% alcohol by volume.

In at least certain disclosed embodiments, transesterification is accomplished using acid or base catalysis, each of which is further described below. Base catalyzed transesterification is typically better for relatively clean oils, such as those which lack substantial amounts of free fatty acids and are relatively water free. Base catalyzed transesterification is typically faster, more complete, and produces a higher purity product compared with acid catalyzed transesterification. However, acid catalysis can be useful when the starting material is not well suited for the base catalyzed process.

In some embodiments, the transesterification is carried out in the presence of a cosolvent. A cosolvent may, for example, aid in mixing of the alcohol and triglyceride, which can enhance the reaction rate. Suitable cosolvents include heterocyclic compounds such as pyridine or tetrahydrofuran, lower alkyl hydrocarbons, such as hexane, ethers, such as methyl tert-butyl ether, and acetamide derivatives, such as bis-(dimethylsilyl)trifluoroacetamide.

Esterification is catalyzed using a catalytic amount of acid, which may be an organic acid, such as acetic acid, citric acid, malic acid, adipic acid, tartaric acid, fumaric acid, p-toluene sulfonic acid, trichloroacetic acid, dichloroacetic acid, benzyl sulfonic acid, or methanesulfonic acid, a mineral acid, such as nitric acid, sulfuric acid, sulfonic acid, hydrochloric acid, phosphoric acid, or iodic acid, or a Lewis acid, such as stannic chloride, aluminum chloride, boron trifluoride. In at least some examples, the acid or acids used to catalyze the transesterification have an acid dissociation constant ($pK_a$) of about 2 or less, such as about 1 or less.

Transesterification may also be carried out using a base catalyzed method, such as using organic bases, Lewis bases, or inorganic bases. Suitable base catalysts include alkali metal hydroxides, such as sodium hydroxide and potassium hydroxide, and alkaline earth metal oxides and hydroxides, such as magnesium oxide, calcium hydroxide, calcium oxide, barium hydroxide, and strontium hydroxide.

Further transesterification methods involve treating the triglyceride with an alkoxide of a hydrocarbon alcohol having the desired ester group, such as methoxides or ethoxides. Methoxides are typically prepared from alkali metals, such as sodium and potassium. In particular examples, the transesterification is carried out using sodium methoxide. Alkoxides typically react with water and thus, in some implementations, the transesterification process 150 uses water free or substantially water free materials. Molecular sieves or similar materials, such as zeolites, silica gels, or acidic clays, or other drying agents, such as sodium sulfate, calcium chloride, magnesium sulfate, potassium carbonate, and calcium sulfate, may be included in the reaction vessel in order to help remove water from the reaction environment.

Transesterification 150 also may be accomplished using a combination of base and acid catalysis. For example, a portion of the triglycerides may be transesterified using an acid catalyst and then a basic catalyst added to the reaction mixture. The basic catalyst is typically added in an amount sufficient to act as a catalyst for the transesterification and an additional amount to neutralize the acid catalyst. Salts formed from the acid-base reaction can be removed following the transesterification, such as by washing the fatty acid ester with water. Water scavengers can be added to the transesterification reaction vessel, such as in a Soxhlet type extraction device, in order to remove water formed from the acid base reaction or by the transesterification reaction. Suitable techniques for such acid/base catalyzed transesterification are described in U.S. Patent Publication US 2006/0094890, incorporated by reference herein.

The reaction is carried out for a time sufficient to allow the reaction to reach a desired level of completion. The reaction time may vary based on the reactants (such as the catalyst and alcohol used) and the reaction conditions, including the temperature of the reaction, pressure, reactant concentration, the nature of the reaction vessel, etc. Typically, reaction is carried out for a period of about 1 minute to about 72 hours, such as between about 5 minutes and about 2 hours or between about 5 minutes and about 15 minutes. Reaction temperature is typically between about 10° C. and about 200° C., such as between about 25° C. and about 75° C. The reaction temperature may depend on the alcohol used, the reaction time, and other process conditions. For example, acid catalyzed transesterification can take substantially longer than base catalyzed methods, and are typically carried out at higher temperatures.

Because the transesterification is catalyzed, a stoichiometric amount of catalyst is not needed. In particular examples, the amount of catalyst is from about 1 wt % to about 40 wt % based on the amount of triglyceride to be transesterified, such as between about 1 wt % and about 10 wt % or between about 1 wt % and about 2.5 wt %. In some implementations, excess catalyst is used to neutralize free fatty acids or other materials in the triglyceride obtained from the coffee, such as when the processing steps described above were not performed after obtaining the triglyceride in process 242. The presence of free fatty acids is determined, in some embodiments, by measuring the pH of the oil. Acidic pH, such as less than about 6.7, can indicate the presence of free fatty acid. Catalyst, or other base, can be added, when base catalyzed transesterification is used, to neutralize the free fatty acid, such as adding base until the pH of the triglyceride is sufficiently neutral.

Another disclosed embodiment for transesterification involves treating the coffee oil and alcohol with a heterogeneous catalyst. The use of a heterogeneous catalyst can have a number of benefits, including eliminating or reducing the complexity of separating the catalyst, reaction products, unreacted starting materials, and other reaction components. In addition, even though homogenous catalysts are not typically consumed during the transesterification reaction, they can be difficult to recover and reuse, thus potentially increasing the expense of the process if fresh aliquots of catalyst must be used during each conversion step.

Suitable heterogeneous catalysts include compounds of alkaline and alkaline earth metals, as well as compounds of Sn, Ge, Pb, Zn, Ti, P, Cd, Ga, In, Th, Sb, As, Tl, Hf, Ac, Ce, Zr, Cr, Fe, Al, Bi, Cs, such as acetates, alkoxides, carbonates, hydroxides, oxides, aluminates, cyanides, and silicates, or zeolites including such elements, their salts, or other compounds, including mixed metal species and combinations thereof. In specific examples, the catalyst is aluminum oxide, magnesium oxide, barium oxide, barium hydroxide, lead oxide, manganese dioxide, silica chloride, calcium carbonate, sodium carbonate, sodium bicarbonate, anionic clays, calcium aluminate, zinc aluminate, zinc oxide loaded with potassium fluoride (such as with 15 wt % KF loading), zeolites, or Li/CaO. In a specific example, the catalyst is a calcium oxide/carbon composite, such as can be formed by heating calcium oxide, a phenolic resin (such as resin 217 from Tianjin Resin Company of Tianjin, China), and hexamethylenetetramine, as described in *Green Chemistry*, 2003, 5, 343-346, incorporated by reference herein to the extent not inconsistent with the present disclosure. In another specific example, the solid catalyst is CaO, such as commercial grade CaO.

In other example, the solid catalyst is a double layer hydroxide, a material having positively charged layers with two different kinds of metal cations and exchangeable hydrated gallery anions. In some examples, the double layer hydroxide is a mixed valence double layer hydroxide, such as a double layer hydroxide having the general formula $A_wB_x(OH)_yC_z.nH_2O$, where A is bivalent metal cation, B is a trivalent metal cation, and C is a monovalent or multivalent anion. Suitable bilvalent cations include $Mg^{2+}$, $Fe^{2+}$, $Mn^{2+}$, $Co^{2+}$, $Ni^{2+}$, $Cu^{2+}$, and $Zn^{2+}$. Suitable trivalent cations include $Al^{3+}$, $Fe^{3+}$, $Mn^{3+}$, $Co^{3+}$, $Ni^{3+}$, $Ga^{3+}$, and $Cr^{3+}$. In addition to double layer hydroxides, oxide precursors or mixed oxide-hydroxide materials are useable as catalysts in particular implementations of the disclosed method.

Suitable double layer hydroxides include hydrotalcite and compounds having similar formulae. In a specific example, the double layer hydroxide is quintinite, including synthetic forms and derivatives thereof. In certain examples, A is $Mg^{2+}$ and B is $Al^{3+}$, such as $Mg_4Al_2(OH)_{12}CO_3.3H_2O$ or $Mg_4Al_2(OH)_{12}CO_3.4H_2O$. In another example, the catalyst is the oxide precursor to quintinite.

Double layer hydroxides can be obtained from natural sources or can be synthesized by various methods, including coprecipitation and using sol-gel methods. Suitable synthetic methods include those discussed in Roelofs et al., *Chem. Eur. J.* 8(24) 5571-5579 (2002), Di Cosimo et al., *Journal of Catalysis* 178 499-510 (1998), and Brei et al., *Microporous and Mesoporous Materials*, 113 411-417 (2008), each of which is incorporated by reference herein to the extent not inconsistent with the present disclosure. In one example, nitrate salts of the metal cations are heated, such as at about 60° C., to form a mixed carbonate species that can be heated at a temperature suitable to drive off the carbonate, such as at about 600° C., to form a mixed oxide. Calcining is typically carried out for a period of about 30 minutes to about 48 hours, such as between about 1 hour and about 24 hours or between about 1 hour and about 3 hours. The mixed oxide can then be treated with decarbonated water to form the double layer hydroxide.

Double layer hydroxide and related catalysts can be reused, in some implementations of the disclosed methods. In some cases, the catalysts are washed with one or more organic solvents prior to reuse. Suitable solvents include polar or nonpolar solvents, or mixtures thereof. In more particular examples, the catalyst is successively washed with one or more polar solvents and one or more non-polar solvents. After washing, the catalyst can be dried prior to reuse, including to remove traces of the solvents used to wash the catalyst. In a particular example, the catalyst is dried at a temperature of between about 40° C. and about 200° C., such as between about 60° C. and about 100° C. or between about 70° C. and about 90° C. for a period of about 5 minutes to about 24 hours, such as between about 1 hour and about 3 hours.

The solid catalyst can be provided in various forms, including balls, extrudates, granules, pellets, or powders. The optimal amount of a given catalyst may be empirically determined, however, the catalyst is typically added in an amount between about 1 wt % and about 20 wt % of the reaction mixture, such as between about 5 wt % and about 10 wt %.

One disadvantage of typical heterogeneous catalysts is that they are used at comparatively higher temperatures, or higher pressures, which can increase the cost of producing biofuels, increase the complexity of the production system, or increase maintenance costs. Although nanocrystalline calcium oxide has been used to catalyze transesterification of oils at room temperature, such materials can be comparatively expensive.

Surprisingly, it has been found that commercial grade heterogeneous catalysts, such as calcium oxide, can transesterify oils, such as coffee oil, at room temperature at higher yields when the reaction mixture is treated with ultrasonication. For example, room temperature treatment of soybean oil with commercial CaO and methanol has been reported to produce a yield of 2% or less of fatty acid esters. When ultrasonication was applied according to the present disclosure, a yield of 35% was obtained. Suitable ultrasonication conditions are described below.

It has also been surprisingly found that double layer hydroxides and their oxide precursors can be used to catalyze transesterification reactions in high yield, such as least about 70%, 80%, 90%, 95%, 98%, 99%. In some examples, the conversion rate is greater than 99%. The use of these solid catalysts can also be advantageous because glycerin can be easily extracted from the reaction mixture, such as using a relatively polar solvent, including short chain aliphatic alcohols, for example, methanol.

Thus, in some embodiments, the methods of the present disclosure include transesterifying an oil, such as coffee oil, by reacting the oil, an alcohol, and a heterogeneous catalyst, such as a commercial grade solid catalyst, such as CaO, using ultrasonication. The mixture of solid catalyst, alcohol, and oil is typically allowed to react for between about 30 minutes and about 24 hours, such as between about 1 hour and about 12 hours, or between about 2 hours and about 6 hours. In a particular example, the mixture is allowed to react for about 2 hours. Longer reaction times can improve yields, at least until the maximum catalyst efficiency has been reached. Optimal reaction times for a given process can be empirically determined.

After the reaction has reached a desired level of completion, the solid catalyst can be separated from the reaction mixture in a variety of ways, including filtering the catalyst from the mixture, decanting the mixture from the catalyst, or centrifugation. The recovered catalyst typically can be reused multiple times. In some cases, steps can be taken to regenerate the catalyst, such as heating the catalyst. In further examples, the catalyst is included in a continuous process, such as in a reactor bed, such that the catalyst remains separated from the reactants. The catalyst material can be regenerated or replaced when its activity falls below a predetermined threshold.

In further examples, other transesterification processes are used in place of or in addition to those discussed above. For example, transesterification can be carried out by enzymatic processes. In addition, transesterification can be carried out using supercritical alcohols, such as with supercritical methanol at about 350° C. and about 35 MPa. Supercritical methanol transesterification is typically complete in a relatively short time, such as about 4 minutes. Transesterification using supercritical methanol can be advantageous as it does not typically require acid or base and can thus simplify subsequent purification or processing steps.

In at least some configurations, the transesterification reaction is carried out with agitation and/or ultrasonication. Such treatment can aid in mixing the triglyceride with the alcohol/catalyst, as the triglyceride may be immiscible, or have limited miscibility, in the alcohol. Agitation may be accomplished by a paddle or blade stirrer attached to a motor, such as a motor operating at about 100 rpm to about 1000 rpm, such as about 300 rpm to about 700 rpm or about 400 rpm to about 600 rpm. Stirring may be accomplished by other means, such as using a magnetic stirring device, or other means of agitation used, such as a shaker.

In further embodiments, ultrasonication, optionally in combination with agitation, is applied during all or a portion of the transesterification reaction. Suitable ultrasonication devices are available from Hielscher Ultrasonics GmbH of Teltow, Germany and Branson Ultrasonics Corporation of Danbury, Conn. Ultrasonicators of any suitable power can be used, such as those having a frequency of 16-45 kHz, power 100-500 W, 20-400 mW/cm$^2$. Ultrasonication power and duration can be selected based on various factors, including the alcohol used for transesterification, the nature of the catalyst, the reaction temperature, and the process conditions of the reaction, such as whether the transesterification occurs as a batch or continuous process. For example, the reaction size or reactant flow rate may influence the power or duration of ultrasonication used.

Ultrasonication may have other benefits, such as reducing the reaction time and reducing the amount of catalyst or alcohol used in the transesterification. In some examples, ultrasonication is carried out while the reactants are under pressure, such as a gauge pressure of about 100 kPa to about 300 kPa.

After the transesterification reaction 250 has reached a desired level of completion, the fatty acid ester product is separated from reactants and reaction byproducts in a separation process 254. In some implementations, the esterified mixture can be neutralized, such as by an acidic wash when a basic catalyst is used in the transesterification 252. Washing with water, such as hot water, can also be used to remove materials, such as acid, from the esterified mixture.

Upon standing, such as for about 12, about 24, about 36, about 48, or about 72 hours, or more, one or more layers may form, such as a fatty acid ester layer, a layer which includes soaps, such as glycerin, and a layer that includes other components, such as water, salts, and unreacted alcohol. Various processes may be used to remove the desired layer or layers, such as decantation, draining at the appropriate level, or sequential removal of layers.

Depending on the processes and materials used in the transesterification, separation of the layers may be difficult or take longer than desired. Therefore, in some examples, gravity separation devices are used to facilitate separating components of the transesterified mixture. The term gravity separator, as used herein, refers to devices which separate materials based on density (specific gravity). Suitable gravity separation devices include hydrocyclones and centrifuges. Ultrasonication can also aid in layer separation.

In further embodiments, the fatty acid ester product is extracted with an organic solvent, which in some embodiments is selected as described above for extraction of triglycerides. In particular examples, the solvent is an ether, such as diethyl ether, or an alkane or cycloalkane, such as hexane. Solvent extraction may take place after other steps, such as neutralization, as described above. Solvent extraction of the fatty acid ester may produce a more pure product.

Glycerin formed from the transesterification process 150, and isolated during the separation process 254, can be further isolated, purified, and put to other beneficial uses. For example, glycerin is used in foods, plastics, lacquers, pharmaceuticals, toothpastes, tobacco, resins, cosmetics, cellulose processing, and explosives.

After separation 254, the fatty acid ester can be further purified or treated in a process 262. For example, the fatty acid ester can be neutralized, particularly if neutralization was not carried out during the separation process 254. When transesterification 250 was carried out using a base or alkoxide, neutralization is typically carried out by washing the fatty acid ester product with one or more dilute acids, such as an aqueous solution of a dilute acid. Suitable acids include organic acids, such as tannic acid, citric acid, salicylic acid, malic acid, maleic acid, acetic acid, or salicylic acid, inorganic acids, such as hydrochloric acid, and Lewis acids. In a particular example, a neutralization solution is used in an amount of between about 20 vol % to about 40 vol % by volume of the amount of raw triglyceride material used in the transesterification reaction 250. Acid is added to this neutralization solution, in some embodiments, in an amount to produce from about a 0.1 mM solution to about a 1 M solution, such as between about a 0.5 mM solution to a 50 mM solution.

Correspondingly, a basic wash can be used to neutralize the product of an acid catalyzed transesterification. Mineral, organic, or other suitable bases, such as Lewis bases, can be used for the neutralization, such as alkaline and alkaline earth metal hydroxides, such as sodium hydroxide or potassium hydroxide.

Additional purification steps can be performed on the crude fatty acid ester in order to make it more suitable as a biofuel. For example, the fatty acid ester can be treated with activated carbon or other substances to remove impurities from the product. Additional water washes can be performed on the fatty acid ester, such as to remove residual salts, catalyst, alcohol, or soaps. The fatty acid ester product can also be dried, such as using molecular sieves or similar materials, such as zeolites, silica gels, or acidic clays, or other drying agents, such as sodium sulfate, calcium chloride, magnesium sulfate, potassium carbonate, and calcium sulfate. The product can also be fractionated to remove impurities or isolate different fuel fractions.

Figure 3:
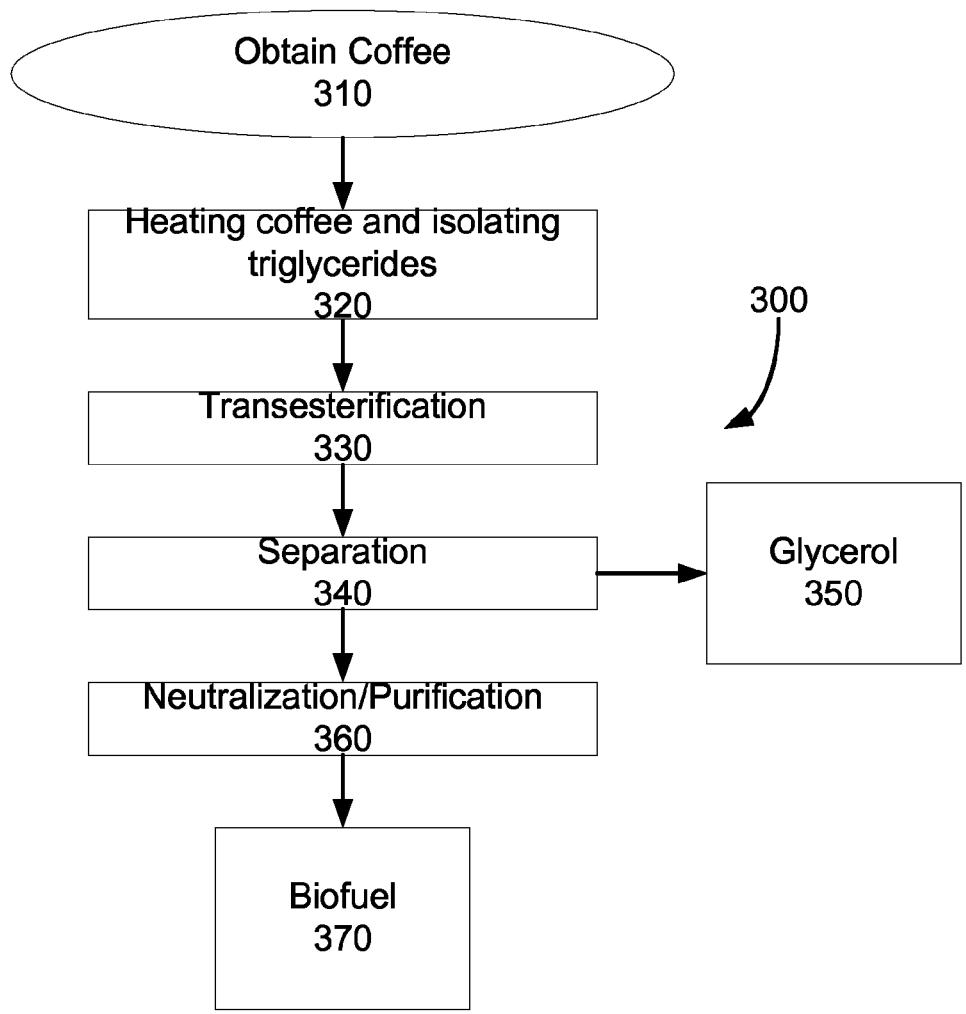
FIG. 3 is a schematic diagram representing a modified version of the process of FIG. 1, where triglycerides are removed from coffee sources without using a solvent.

FIG. 3 illustrates a variant of the process 200 of FIG. 2. Rather than chemically extracting triglycerides from coffee, in the process 300, the triglycerides are extracted by heating the coffee material until the triglycerides volatilize and then collecting the volatilized triglycerides, such as in a dry distillation technique. Coffee is obtained in step 310 in a manner analogous to any of steps 206, 210, 215, 218, 222, 230, 238 of FIG. 2.

The coffee from step 310 is heated in step 320 to volatilize the triglycerides, such as heating the coffee at a temperature of between about 100° C. to about 700° C., or between about 200° C. to about 400° C. In at least some embodiments, the heat extraction is carried out under vacuum to reduce the temperature at which the triglycerides volatilize, such as about 0.1 kPa to about 10 kPa. Particular embodiments employ short path distillation or use a Kugelrohr apparatus. If desired, the distillate can be fractionated to separate various components of the triglyceride mixture, including different triglycerides, free fatty acids, and other components, such as antioxidants.

After heating in process 320 and collecting triglycerides and other materials, the products are transesterified in process 330 and separated from the reaction mixture in step 340 to obtain purified fatty acid esters and, optionally, glycerol. Neutralization and purification processes 360 may be carried out to produce a biofuel 370. The processes 330, 340, and 360 may be carried out as described for the corresponding processes in FIG. 2.

Compared with other methods of extracting triglycerides from coffee, the heating process 320 can provide a number of advantages. For example, heating dry coffee avoids the use of organic solvents, which can be expensive to use, can cause environmental problems, and typically require more processing steps and components. In at least some embodiments, it can be advantageous to reduce system complexity, such as to allow smaller biodiesel production systems to be developed. In addition, when fractionation is used to separate components in the raw triglyceride mixture, the properties of the biofuel 370 produced by the system 300 can be tailored, such as by selecting only certain triglycerides for processing or removing free fatty acids. Such fractionation can also enhance the results of the subsequent transesterification, such as by producing a cleaner starting material less susceptible to side reactions.

Systems for Biodiesel Production

Figure 4:
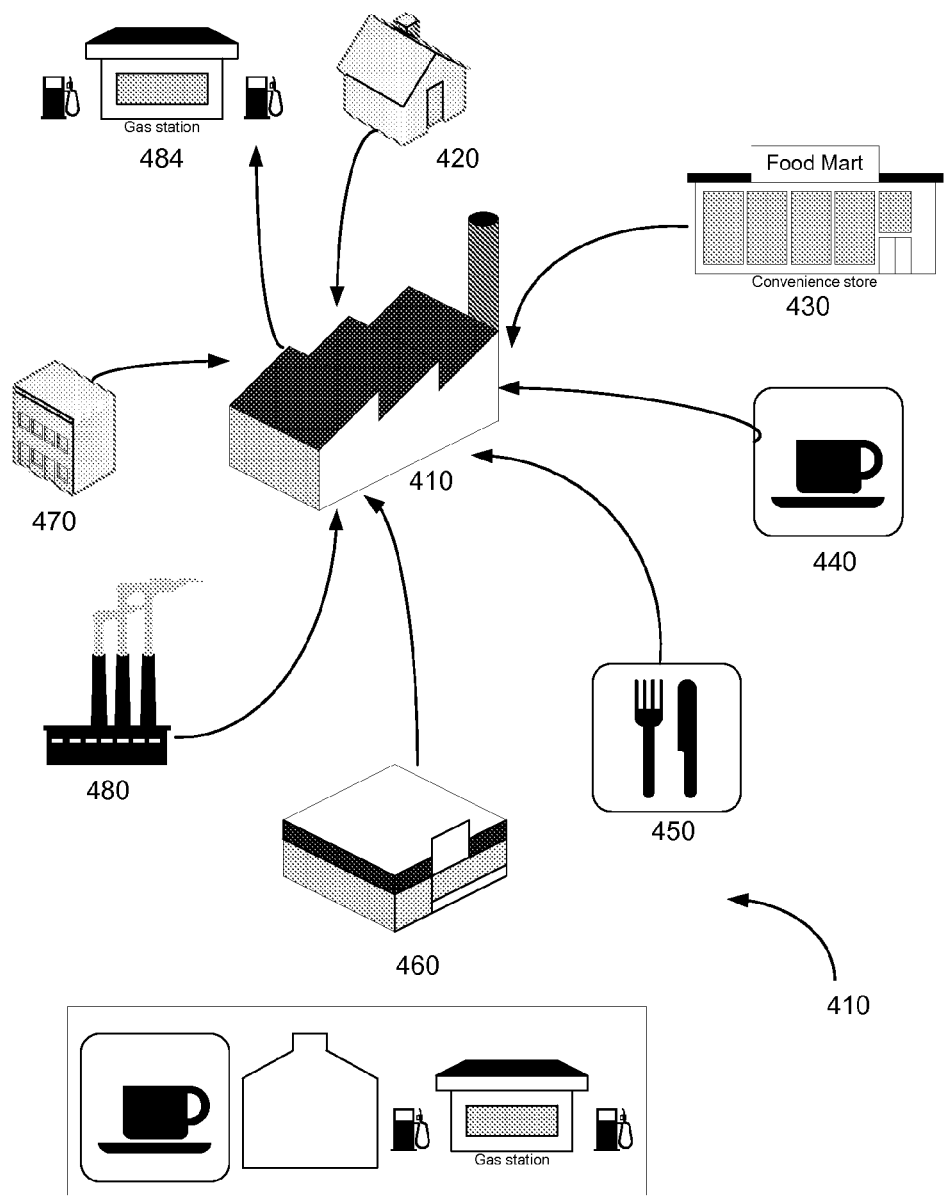
FIG. 4 is a schematic diagram of a system for obtaining coffee from coffee sources and producing biofuel from the collected coffee.

The present disclosure also provides embodiments of a system and method for biodiesel production, including methods for obtaining coffee from sources for use in the systems of FIGS. 2 and 3, and for systems for producing biodiesel from the collected coffee. FIG. 4 illustrates a method 400 whereby coffee, such as spent coffee grounds, from a variety of sources are collected and processed into biofuel at a central production facility 410. In some embodiments, facility 410 located by another biodiesel production facility, can aid in producing fuel mixtures.

In the method 400, one source of coffee is residences 420, such as apartments, houses, dormitories, prisons, and the like. In at least some implementations, the spent coffee grounds are picked up by a service, such as a recycling service operated by a municipality or a private business. In addition to garbage and traditional recycling, spent coffee grounds can be collected by end users and then collected by the service. A special container for such grounds is provided in some embodiments.

Other sources of coffee for the facility 410 include convenience stores 430, such as those associated with gas stations and convenience stores, coffee shops 440, restaurants 450, grocery stores 460, and offices 470. Industrial operations 380 which use coffee, such as from commercial food and beverage production, may also serve as a source of coffee for the production facility 410. In some embodiments, such as when a vendor provides coffee to the coffee source, the vendor may also be responsible for picking up spent coffee. In yet further embodiments, a separate company collects the spent coffee grounds for transportation to the production facility 410 or other biofuel production system.

In further embodiments, such as when smaller size production facilities 410 are used, the production facility may be located at one of the sources of coffee, such as at a coffee shop 440. Significant sources of coffee, such as a coffee shop, are provided with discrete processing units in some embodiments. Locating production facilities at or near sources of coffee can reduce costs associated with collecting and transporting the coffee.

In some implementations produced biofuels are collected, such as from the production facility 410, and transported to one or more distribution centers 484. In further implementations, a combined facility 490 uses coffee, converts the spent coffee to biofuel, and distributes the biofuel.

Of course, it will be realized that numerous variations can be made to the system 400 of FIG. 4. For example, one or more of the coffee sources may be omitted or different coffee sources may provide coffee to different production facilities. Although a coffee shop is shown with an integrated biofuel production system, other coffee sources may have such systems. In addition, rather than being collected by a production facility 410, coffee from a coffee source may be collected by another coffee source, such as a coffee source with an on-site production facility.

In further implementations, produced biofuel is dispensed at or near the site of production to help reduce transportation costs.

Biofuel Production Apparatus

Suitable biofuel production units employing the methods of the present disclosure may be created by modifying existing biofuel production units. Existing production units are typically configured to convert oils to fatty acid esters. However, it is less common for production units to be configured to extract oils from a raw material, particularly using chemical extraction.

Figure 5:
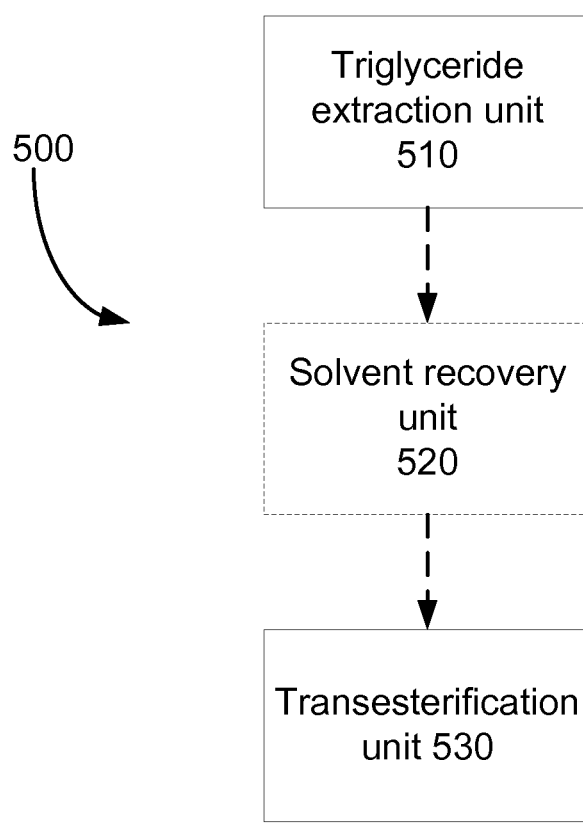
FIG. 5 is a schematic diagram of an apparatus for producing biofuel from coffee.

FIG. 5 presents a schematic diagram of a suitable biofuel production unit 500. The unit 500 includes a triglyceride extraction unit 510, which may be a solvent extraction unit or a distillation unit. Suitable solid-liquid extraction devices that can interface with existing biofuel production equipment are available from Armfield Ltd. of Ringwood, UK, including the UOP4MkII and the FT29. In some cases, the triglyceride extraction unit 510 includes a solvent recovery component. In alternative embodiments, a separate solvent recovery unit 520 is included in the unit 500.

The triglycerides from the triglyceride extraction unit 510 or solvent recovery unit 520 are processed into biodiesel in a transesterification unit 530. In some implementations, the transesterification unit 530 is a conventional biodiesel production apparatus. Suitable conventional biodiesel processing units are available from numerous commercial vendors, including BioKing USA LLC of Pearland, Tex., EuroFuelTech, SunBio Systems of Santa Clara, Calif., Flying F Bio-Fuels of Tiffin, Iowa, and Kreido Biofuels of Camarillo, Calif.

The fuels produced using the methods, apparatus, and systems of the present disclosure can have a number of advantageous compared with biofuels produced using other sources or methods. Conventional biofuels are typically stable for less than 12 hours.

At least certain methods and systems of the present disclosure provide biofuels having substantially greater stability than typical biofuels. Such stability is achieved, in some examples, without the addition of antioxidants. In some examples, at least certain fuel produced according to the present disclosure have comparatively high concentrations of antioxidants, such as between about 0.5 wt % to about 30 wt %, such as between about 1 wt % and 15 wt %, between about 1 wt % and about 10 wt %, between about 3 wt % to about 8 wt %, or between about 2 wt % and about 5 wt %. The comparatively high antioxidant levels of such fuels can results in fuels which are stable for at least about 12 hours, such as at least about 24 hours, at least about 48 hours, at least about seven days, at least about 30 days, or at least about 90 days.

Fuels having high stability can have a number of advantages. Higher stability may mean that less fuel is wasted due to spoilage. More stable fuels can also reduce mechanical problems, as there may be reduced concern about fuel becoming unstable while in a vehicle or other fuel consumer, and possibly causing problems when the spoiled fuel enters the engine, or contacts other system components. Correspondingly, the space allocated for fuel storage may be increased if spoilage is less of a concern, which can provide a greater operational range or time for fuel consumers, such as a car being able to travel further or longer before refueling.

Similarly, enhanced fuel stability may aid in transportation and storage of fuel for distribution to end users. For example, fuel production centers may be located further from distribution channels if the fuel is more stable, which can reduce the number of production centers required. Distribution centers can have larger storage capacities when fuel is more stable, which can reduce the chances for contamination from unstable fuel and can reduce the frequency at which the storage of such distribution centers needs to be refilled or maintenance performed.

In some disclosed embodiments, fuel mixtures are produced using coffee sourced biofuels according to the present disclosure. Biofuel mixtures having enhanced stability compared with traditional biofuels can be produced by mixing an amount of a coffee sourced biofuel according to the present disclosure and one or more other fuels or biofuels, such as B20. In specific examples, the biofuel with which the coffee biofuel is mixed is selected from a fuel made with one or more of vegetables, jatropha, sunflower, coconut, cotton seed, palm, rapeseed, soy bean, hemp, olives, peanuts, hemp seeds, algae, grains, or from animal fats, such as chicken, cattle, or hog fat. In various examples, a biofuel mixture includes from about 0.1 wt % to about 50 wt % of coffee sourced biofuel, such as a coffee based biofuel according to the present disclosure, such as between about 0.2 wt % and about 10% wt % or between about 0.2 wt % and about 5 wt %. The fuel mixture can include additional components, including traditional petroleum based fuels, such as diesel.

In further embodiments, antioxidants are extracted from the coffee oil extracted from a coffee source, as disclosed above, or from the fatty acid esters produced therefrom. Methods of separating various antioxidant components of coffee are disclosed in Stalmach et al., *Braz. J. Plant Physiol.*, 18(1), 253-262 (2006), incorporated by reference herein. Additional suitable separation techniques are disclosed in Naczk, et al., *J. Pharm. Biomed. Anal.*, 41, 1523-1542 (2006), also incorporated by reference herein. In one embodiment, reverse phase column chromatography is used a solvent gradient, such using water and acetonitrile mobile phases. In one example, a gradient is used where the mobile phase includes 10% acetonitrile for two minutes, increases to 100% acetonitrile over 20 minutes for a period of two minutes before returning to 10% acetonitrile for an additional two minutes.

In specific examples, the antioxidants obtained from such methods are added to biofuels, such as biofuels produced from conventional sources such as animal fats and plant oils. In particular examples, the antioxidants are added to the conventional biofuel in an amount between about 0.2 wt % and about 10 wt % or between about 0.2 wt % and about 5 wt %. Antioxidants can be used for other applications, such as in cosmetic, medicinal products, or food products.

At least certain embodiments of the disclosed method produce biofuel from spent (water-extracted) coffee. Water extraction can remove substances from the coffee that would be detrimental to resulting biofuel performance, such as nitrogenous compounds like caffeine. In addition, using coffee from such sources can reduce processing requirements, since extracted coffee is likely to have already been roasted and ground.

Compared with oil obtained from pressing green coffee, coffee sources described above can include less water, which can hinder transesterification and result in incomplete reaction. Incomplete reaction can make it difficult to separate glycerin from triglyceride/biodiesel.

Although the present disclosure generally describes production of triglycerides and fatty acid esters from a pure coffee feed source, the present disclosure can be implemented otherwise. For example, the disclosed methods, systems, and apparatus can be modified to operate using mixed feed sources, such as coffee and another feed source, such as a conventional biodiesel source, at one or more stages. Such mixed feed sources can be used, for example, to produce fuel mixtures described above having enhanced stability.

Uses of Processed Spent Coffee Grounds

The biodiesel production methods described above produce processed spent coffee grounds, which have had triglycerides, antioxidants, and other materials removed from them. The processed spent coffee grounds may be put to further beneficial uses.

Spent coffee grounds are commonly used as compost material. Processed spent coffee grounds may also be employed as compost or fertilizer. Elemental analysis has shown that coffee grounds processed using a disclosed method do not have a significantly altered C/N ratio compared with unprocessed spent grounds. The processed grounds exhibited a C/N ratio of about 16:1, while the unprocessed spent grounds had a C/N ratio of about 20:1.

Another application of processed spent coffee grounds is fire logs, or similar compressed flammable products. U.S. Pat. Nos. 5,910,454 and 6,793,697, each of which is incorporated by reference herein to the extent not inconsistent with the present disclosure, relate to the production of solid burnable fuel compositions using spent coffee grounds. These patents describe forming combustible materials using spent coffee grounds, a combustible binder, and, optionally, other additives, such as coking agents. However, these patents describe the use of petroleum based binders, such as wax, and sugar based binders.

It has been discovered that combustible solids can be produced by compressing spent coffee grounds, including processed spent coffee grounds, with glycerin. The combustible solids typically include between about 0.5 wt % and about 50 wt % glycerin, such as between about 1 wt % and about 20 wt % or between about 1 wt % and about 10 wt %. In further examples, the combustible solids include less than about 10 wt % glycerin, such as less than about 5 wt % or less than about 2 wt %. In a specific example, the combustible material includes about 1 wt % glycerin.

The pressure needed to form a suitable combustible solid typically depends on the amount of glycerin included in the composition. Greater amounts of glycerin typically result in lower pressures being needed to form the solid. In typical applications, the compression pressure is being about 6.51 MPa and about 110 MPa, such as between about 34 MPa and about 83 MPa or between about 48 MPa and about 80 MPa. The amount of pressure needed to produce a suitable composition for a given amount of glycerin, or the amount of glycerin needed for a desired pressure to be useable, can be empirically determined. These parameters are typically selected such that the product has a sufficiently low friability, such as one that allows the solid material to be packaged, transported, or used without an undesired level of crumbling or breakage.

Prior art apparently does not recognize the benefits of using glycerin as a binder for coffee-based combustible solids. Given that the above-described coffee biofuel methods can produce glycerin as a byproduct, the present disclosure allows for the production of useful combustible materials using spent coffee and glycerin, materials which might otherwise be treated as waste products. Using glycerin as a binder thus allows combustible solids to be produced at a lower cost, and saving petroleum, sugars, or other binder materials which may then be put to other beneficial uses.

Accordingly, methods and systems according to the present disclosure, including the methods and systems described above, can include additional steps or additional system components to combine glycerin and processed spent coffee grounds into combustible solids.

Other Uses of Coffee Extracts

As explained above, coffee extracts can be high in antioxidants, which can provide a number of benefits. For example, antioxidants are common additives in cosmetics and other personal care products, such as moisturizing creams and lotions, lip balms, body scrubs, sunscreens and suntan lotions, and the like. Accordingly, the coffee extracts produced using the above described methods, including coffee oil as extracted from the spent coffee grounds or fatty acid esters produced therefrom, can be included in various cosmetic or personal care compositions. The extracts can be used neat, or mixed with other components, such as to produce a cosmetic or personal care product. The production of such materials is known in the art and the coffee extract can be included in a desired amount, such as to produce a product having appropriate compositional properties (such as stability or tactile properties) or to produce a desired antioxidant level in the product.

As antioxidants are known to have health benefits, the coffee extracts produced according to the present disclosure can also be used in ingestible products, including foods, beverages, and oral delivery devices such as tablets, pills, capsules, troches, lozenges, and the like.

EXAMPLE 1

Roasted, ground, water-extracted coffee was refluxed for 1-6 hours with, in different instances, ether or dichloromethane. The resulting solution was filtered through a paper filter to remove coffee grounds and other particulate matter. Triglycerides were collected by evaporating the solvent on a rotary evaporator.

The resulting triglycerides were transesterified using methanol and sodium hydroxide as a catalyst. Methanol was added in an amount of 40% of the volume of oil used (for example, 40 mL of methanol for 100 mL of oil). Sodium hydroxide was added in an amount of 1.5% of the weight of the oil (for example, 1.5 g of NaOH was used for 100 g of oil).

The mixture was refluxed for two hours. After that time, the remaining methanol was removed on a rotary evaporator. The residual material was extracted with ether and separated from sodium hydroxide and glycerin using a separatory funnel. The pH of the fatty acid ester portion (top layer) was determined to be about 8. The fatty acid ester product was then washed with acidified water (typically using an organic acid, such as tannic acid, such as a 0.1 wt % solution in water) at a 1:1 ratio by volume to remove the traces of catalyst (NaOH) and soap. After washing, the pH of the fatty acid ester was about 6.8.

Figure 6:
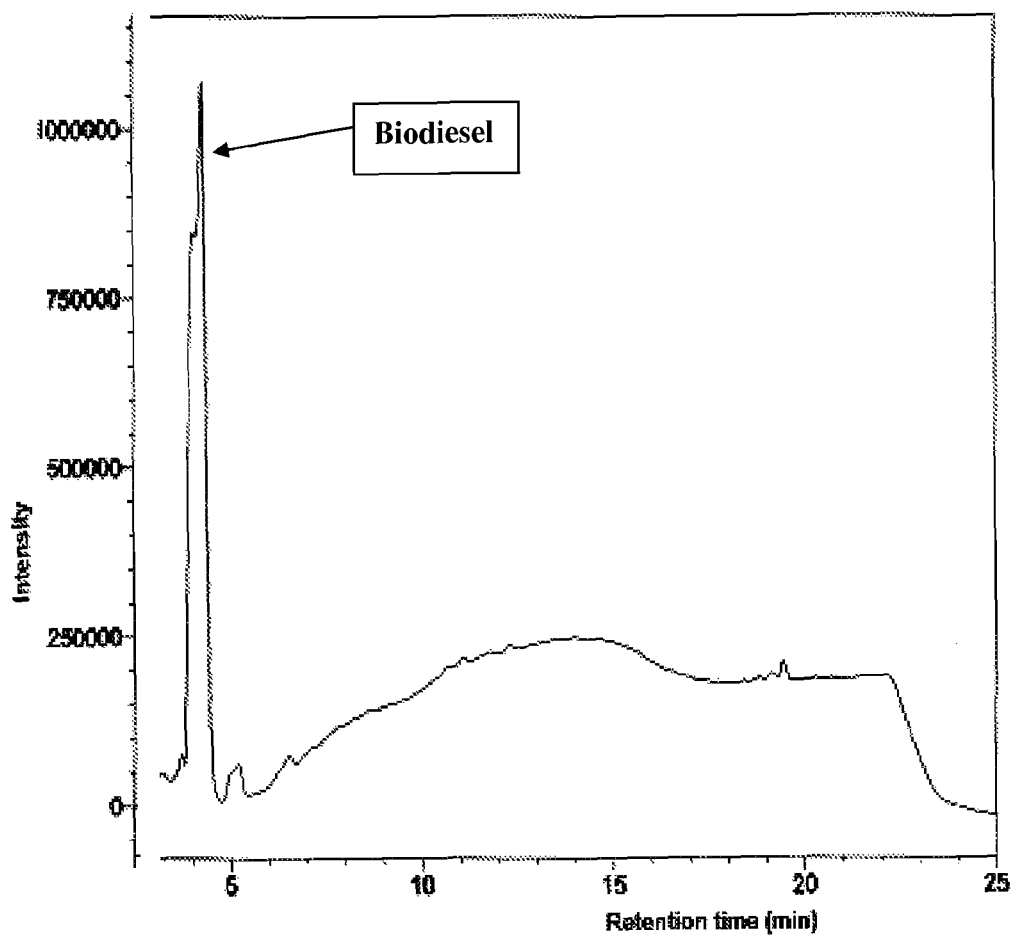
FIG. 6 is an HPLC chromatogram of a biodiesel sample produced according to an embodiment of a disclosed method.

The fatty acid ester was evaluated by HPLC. A 150×3.2 mm stainless steel C18 (7 μm particles) column was used with two mobile phases applied in a gradient. Methanol was used as one mobile phase. The other mobile phase was a mixture of isopropanol and hexane, 4:5 by volume. The resulting HPLC chromatogram (monitored at 205 nm) is shown in FIG. 6. The chromatogram indicates a single major component which eluted at about 4 minutes.

Figure 7:
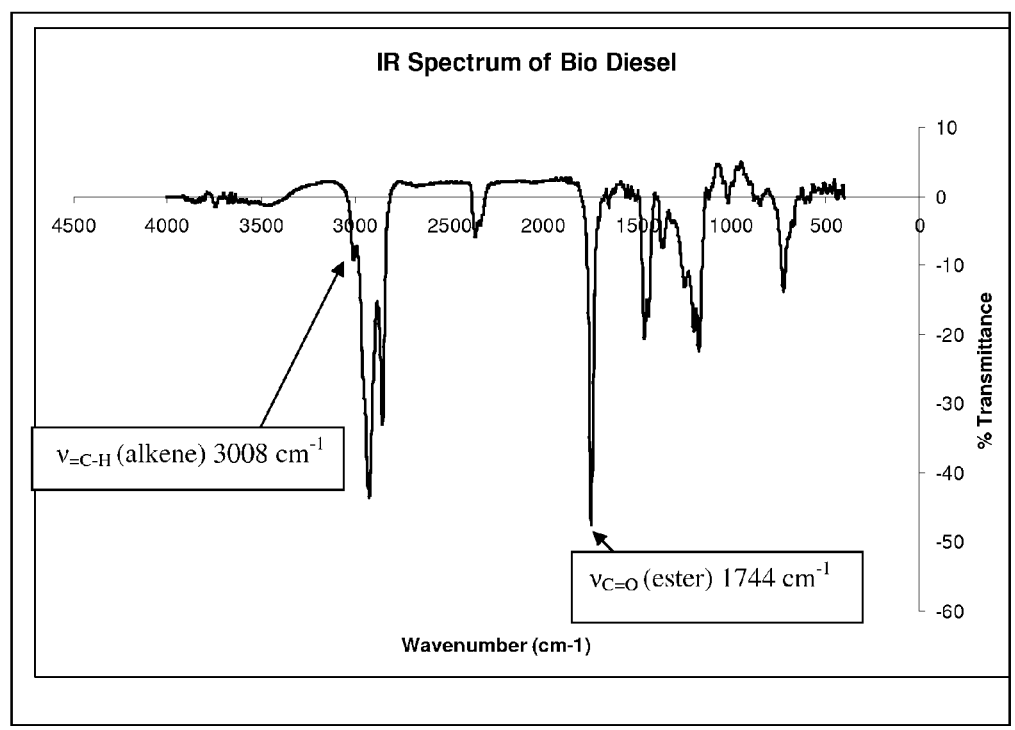
FIG. 7 is an FTIR spectrum of a biodiesel sample produced according to an embodiment of a disclosed method

The fatty acid ester product was also analyzed using Fourier Transform Infra Red Spectroscopy (FTIR), the FRIT spectrum is shown in FIG. 7. The presence of fatty acid esters was confirmed by the appearance of an alkene stretching frequency at about 3008 $cm^{-1}$ and a C=O ester signal at about 1744 $cm^{-1}$. No OH-stretching frequency was observed, also supporting formation of the ester product.

Figure 8:
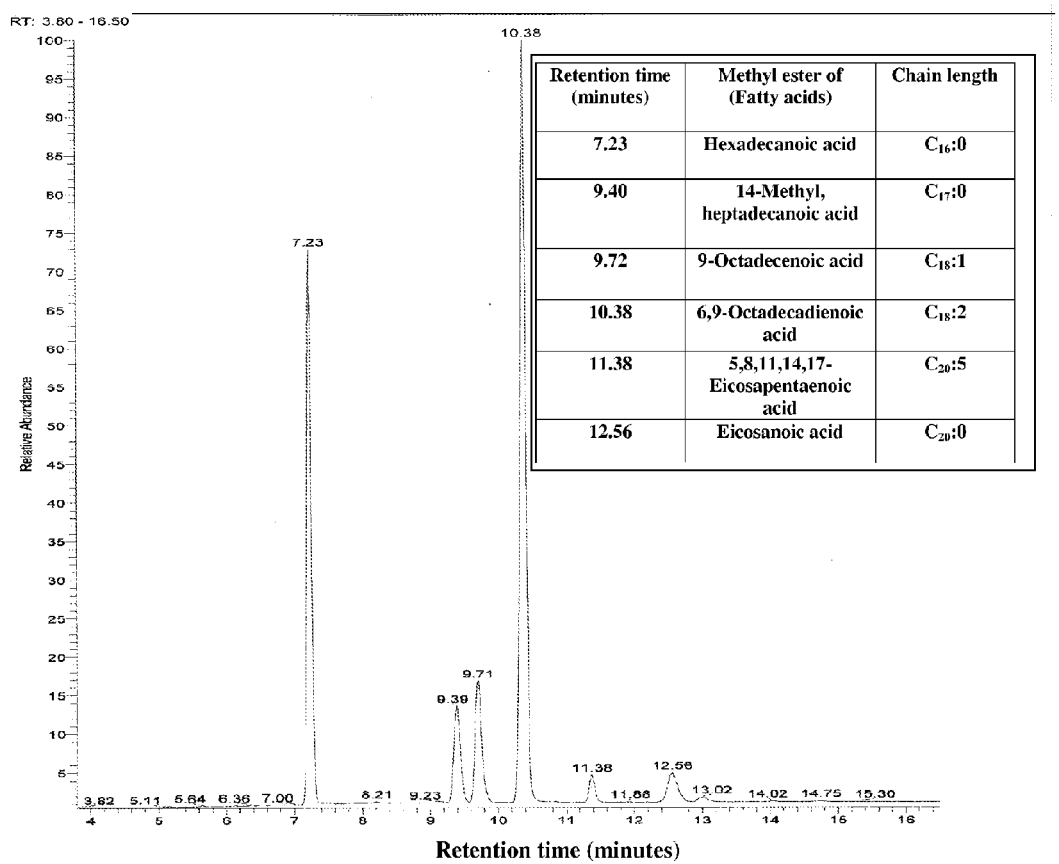
FIG. 8 is a gas chromatogram of a biodiesel sample produced according to an embodiment of a disclosed method.

Gas Chromatography data, shown in FIG. 8, indicated that two major products were present in the fatty acid ester, along with small amounts of several other species. Mass spectroscopy (data not shown) was used to further identify these components. The chain lengths resulting from this data are shown in the inset table in FIG. 8 As shown, the two major components of the biodiesel produced in this Example were methyl palmitate (C16:0) and methyl linoliate (C18:2).

The firing properties of the biofuel were compared with a standard biodiesel sample, B100. A cotton swab was dipped in each sample. Open flame was applied to the saturated tips of the swabs. The time to catch fire and flame properties of the coffee biodiesel were comparable to that of the B100 sample. After burning, the swab used for the coffee biodiesel was clean, indicating that the biodiesel fuel was comparatively clean, as dirty fuels, such as those which contain sulfur, typically leave a layer of soot or other material on the swab after burning.

Figure 9:
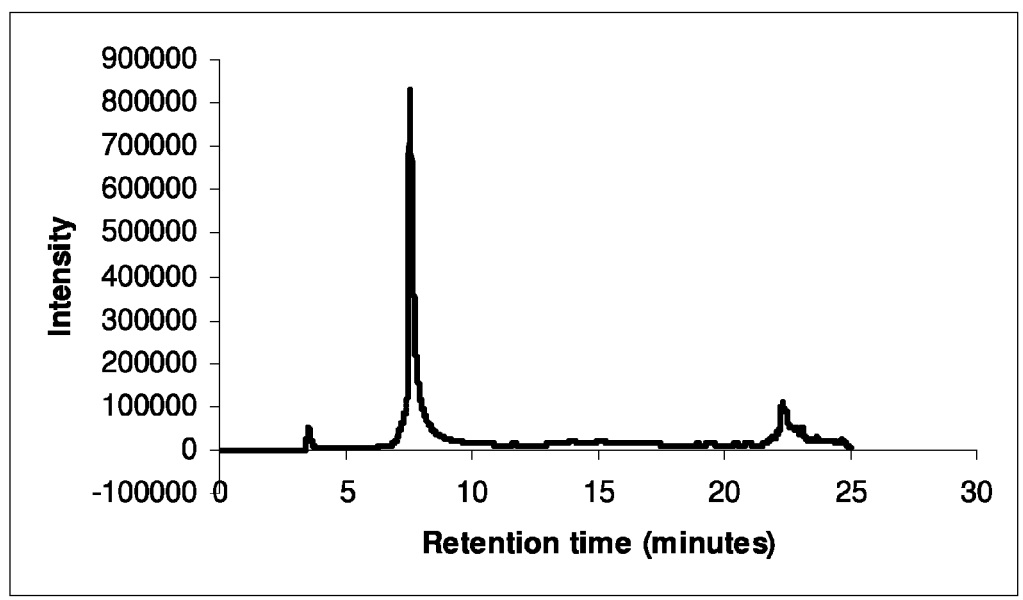
FIG. 9 is an HPLC chromatogram of catechol.
Figure 10:
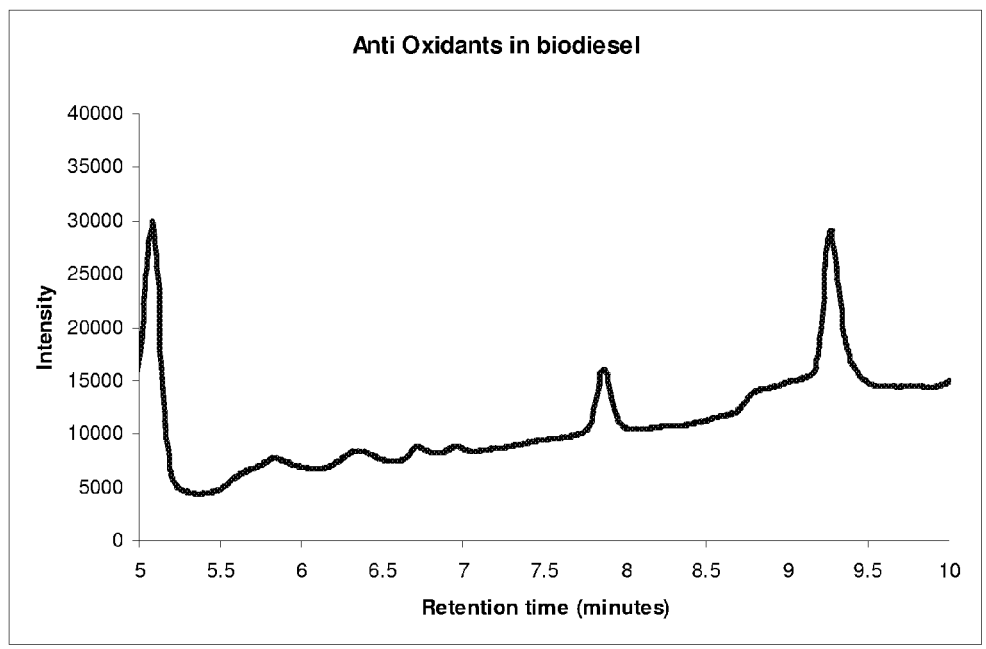
FIG. 10 is an HPLC chromatogram of a fatty acid ester sample produced according to an embodiment of a disclosed method.

In order to help demonstrate that the biodiesel produced from coffee contains antioxidants, catechol, which is included a unit on many of the antioxidants known to be present in coffee, was passed through an HPLC column. As shown in FIG. 9, peaks were observed at around 4 minutes and around 8 minutes. A coffee biodiesel sample was also passed through the column and exhibited peaks at around 5, 8, and 9.5 minutes, as shown in FIG. 10. The similarity between the retention times of catechol and biodiesel may indicate that compounds containing catechol units, such as antioxidants, are present in the biodiesel produced from coffee.

The stability of the fatty acid ester (biodiesel) was observed by monitoring the phase stability of the sample. The sample demonstrated phase stability for greater than 90 days, after which the formation of another layer was observed. In further examples, the stability was confirmed by monitoring the pH (acidification of the sample indicating instability) or monitoring by HPLC.

EXAMPLE 2

Roasted, ground, water-extracted coffee was refluxed with water for 2-8 hours at 120° C. Two layers formed. The top layer was a triglyceride layer and the bottom layer included water and the coffee grounds. The organic layer (triglyceride) was separated from the water and grounds using a separatory funnel. In some cases, the triglyceride fraction was collected by removing residual water on a rotary evaporator. In further cases, hexane was added to the triglyceride to extract it from the residual water. The hexane was removed using a rotary evaporator.

The triglycerides were transesterified using methanol and sodium hydroxide (NaOH) by refluxing the mixture for a few minutes to several hours. HPLC studies of the reaction kinetics indicated that the reaction was substantially complete after about 15 minutes. The crude product was extracted with diethyl ether. After evaporation of diethyl ether using a rotary evaporator, the remaining crude fatty acid ester product was washed with acidified water to remove NaOH and soaps. The esterified product was observed as a layer on the top of the water. The identity of the product was confirmed by HPLC (data not shown).

EXAMPLE 3

Roasted, ground, water-extracted coffee was refluxed with diethyl ether for 2-12 hours. The resulting mixture was filtered through filter paper to remove the coffee grounds. The ether was removed on a rotary evaporator. Propanol was added to the resulting triglyceride product and shaken. The triglyceride was separated from the propanol phase using a separatory funnel.

The triglycerides were refluxed with catalytic amount of potassium hydroxide in methanol for 2 hours. After that time, acidified water (0.1 wt % tannic acid) was added to the reaction mixture. Three layers formed. The top layer was a fatty acid ester layer, the middle layer included soaps, and the bottom layer included water, catalyst and methanol. The identity of the fatty acid ester product was confirmed using HPLC.

EXAMPLE 4

Compressed combustible materials were created by compressing processed spent coffee grounds with varying amounts of glycerin binder obtained from processing spent coffee grounds to produce biofuel. In addition to the effect of the amount of glycerin, applied pressure, pressure ramping, and the time of applied pressure were studied for their effects on the produced compressed material. Samples were formed using pressures ranging from 2200 psi to 11200 psi.

The procedure for producing a 1 wt % glycerin sample using multiple pressures is provided as an example of the procedure used in preparing samples. Other samples were produced in an analogous manner. 32 g of processed spent coffee grounds were mixed with 320 mg of glycerin and mixed using a mortar and pestle. A portion of the mixture thus obtained was placed in a circular disk having a diameter of 75 mm and pressed against a hydraulic press multiple times at increasing pressures. In this test, the pressure was ramped from 2200 psi to 11000 psi, as shown in the table below. The pressure was applied for 15 seconds for each pressure increment, with the exception of the 11000 psi increment, where pressure was applied for 60 seconds.

| Pressure (psi) | Time (seconds) |
| --- | --- |
| 2200 | 15 |
| 4400 | 15 |
| 6600 | 15 |
| 8800 | 15 |
| 11000 | 60 |

Figure 11:
FIG. 11 is a SEM image of a combustible coffee material produced according to an embodiment of a disclosed method.
Figure 12:
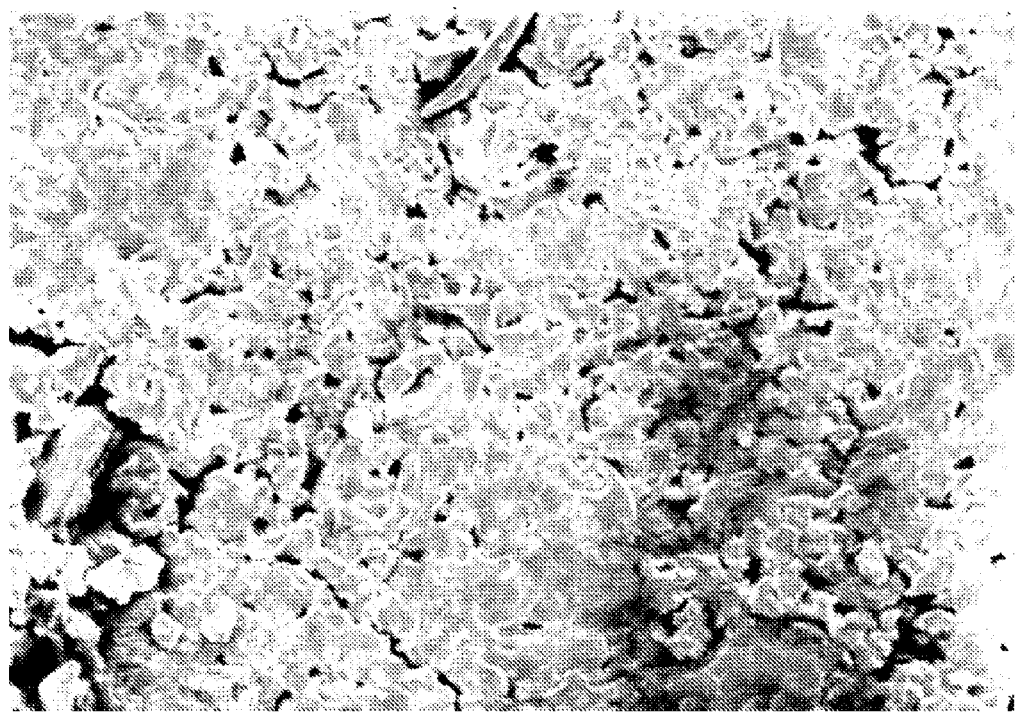
FIG. 12 is a SEM image of a combustible coffee material produced according to an embodiment of a disclosed method.

SEM (Scanning Electron Microscopy) images (FIGS. 11 and 12) shows the integrity of the composition produced using the ramped pressure method. No severe cracks were observed in the image. In addition, no severe cracks were observed after storing the disc for a month. As shown in FIG. 12, the particles size of the samples were found to be 20-30 μm.

Figure 13:
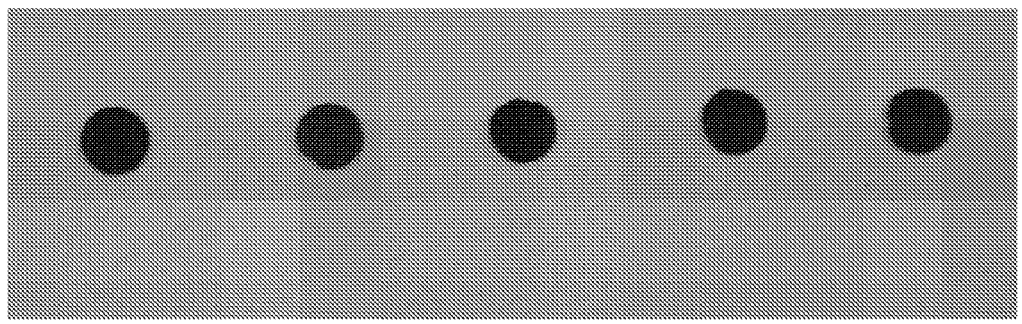
FIG. 13 is a photograph of combustible coffee materials produced according to an embodiment of a disclosed method.

In another test, samples were formed using 1 wt %, 2 wt %, 5 wt %, 10 wt %, and 20 wt % glycerin using the ramped pressure scheme in table above. A photograph of the samples thus obtained is shown as FIG. 13. All samples were free of severe surface cracks visible to the naked eye.

EXAMPLE 5

2.6 g of methanol and 1.0 g CaO were mixed in a 100 ml round bottom flask. To this mixture, 10 g of extracted coffee oil was added. The mixture was ultrasonicated at room temperature for 2 hours. HPLC analysis confirmed that biodiesel was obtained in a 35% yield by weight. CaO catalyst was recollected by centrifuging the reaction mixture for 1 hour at 5000 rpm.

EXAMPLE 6

2.6 g of methanol and 1.0 g CaO were combined in a 100 ml round bottom flask. To this mixture, 10 g of coffee oil was added. The mixture was refluxed for 2 hours. HPLC analysis confirmed that biodiesel was obtained in a 30% yield by weight. CaO catalyst was recollected by centrifuging the reaction mixture for 1 hour at 5000 rpm.

EXAMPLE 7

A first solution was made by adding 0.1 moles of $Mg(NO_3)_2.6H_2O$ and 0.05 moles of $Al(NO_3)_3.9H_2O$ to 45 mL of deionzed water. A second solution was made by adding 0.35 moles of NaOH and 0.09 moles of $Na_2CO_3$ to 70 mL of deionized water. The second solution was heated to 60° C. and then the first solution was added to the second solution in a single addition. The resulting mixture was refluxed for 24 hours with stirring.

After refluxing, the resulting white precipitate, the mixed carbonate species, was collected and washed with deionized water until the pH of the wash water was 7.0. The precipitate was then dried at 120° C. for 4 hours and then calcined at 600° C. for 3 hours. Decarbonated water was added to the precipitate to yield $Mg_4Al_2(OH)_{12}CO_3.3H_2O$.

Figure 14:
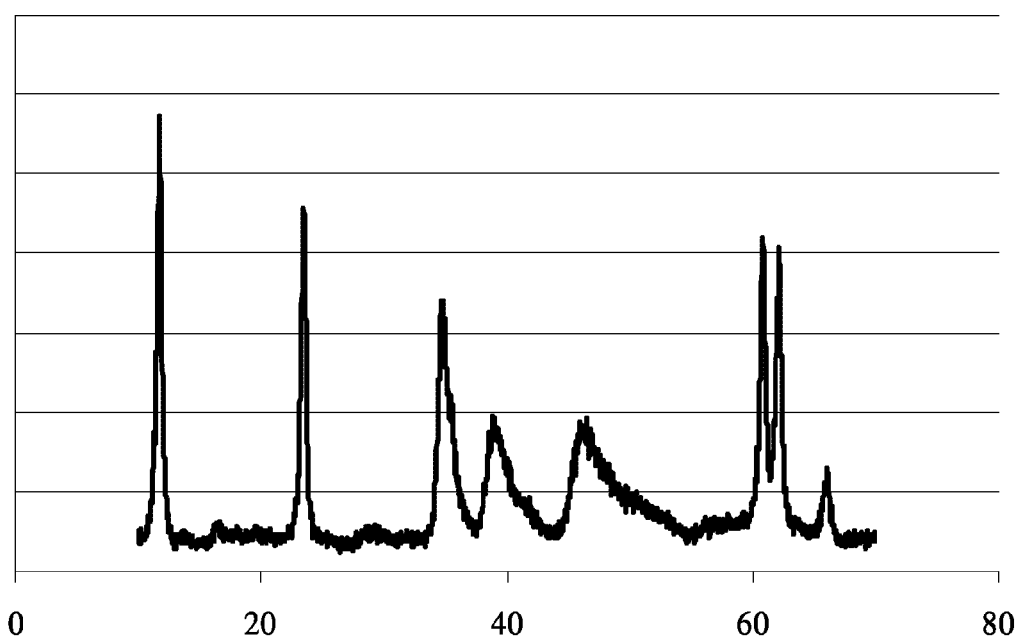
FIG. 14 is an X-ray diffraction (XRD) spectrum of a disclosed $Mg^{2+}$, $Al^{3+}$ mixed carbonate species.
Figure 15:
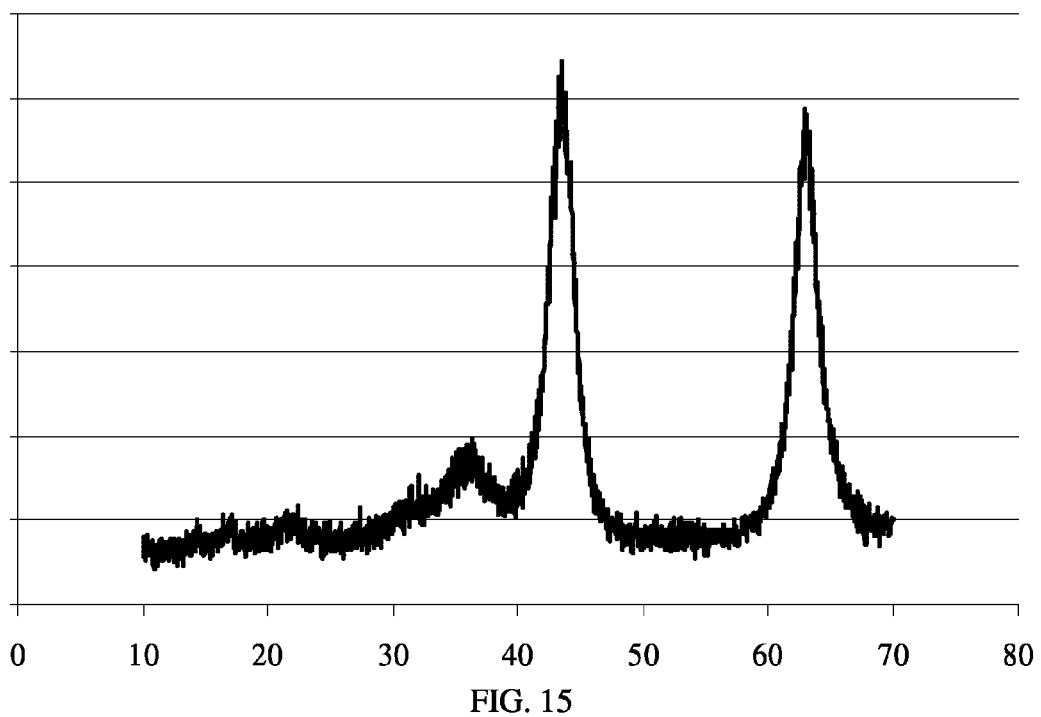
FIG. 15 is an X-ray diffraction (XRD) spectrum of a disclosed $Mg^{2+}$, $Al^{3+}$ mixed oxide species.
Figure 16:
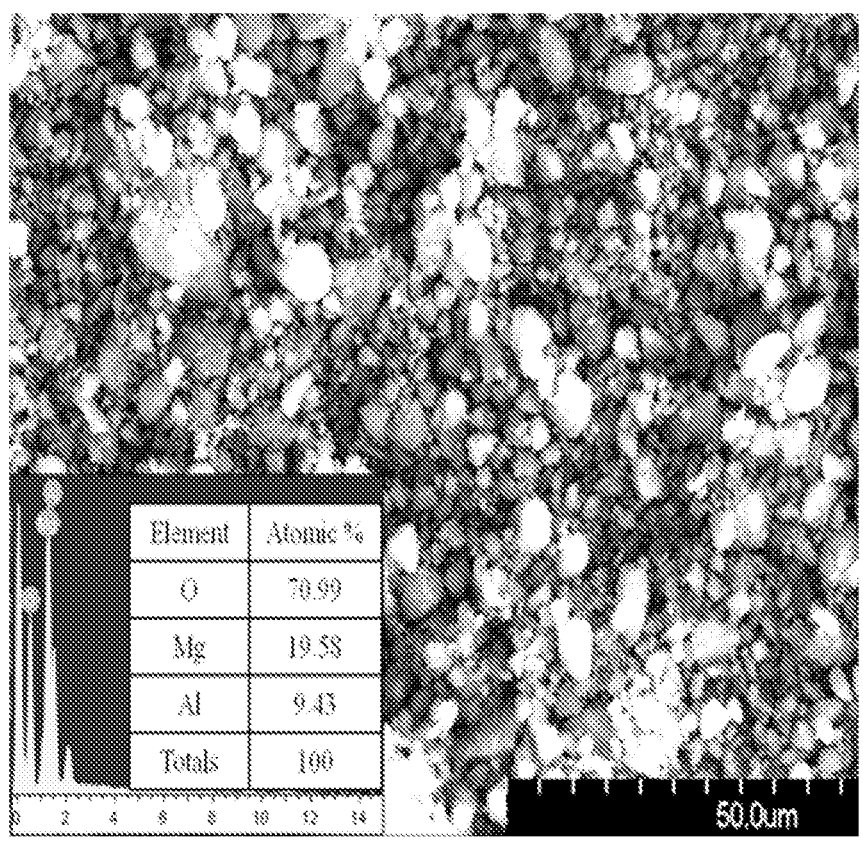
FIG. 16 is a SEM image of a the mixed oxide material of FIG. 15 having an insert energy dispersive electron (EDX) spectrum showing the atomic percentages of magnesium, aluminum, and oxygen.
Figure 17:
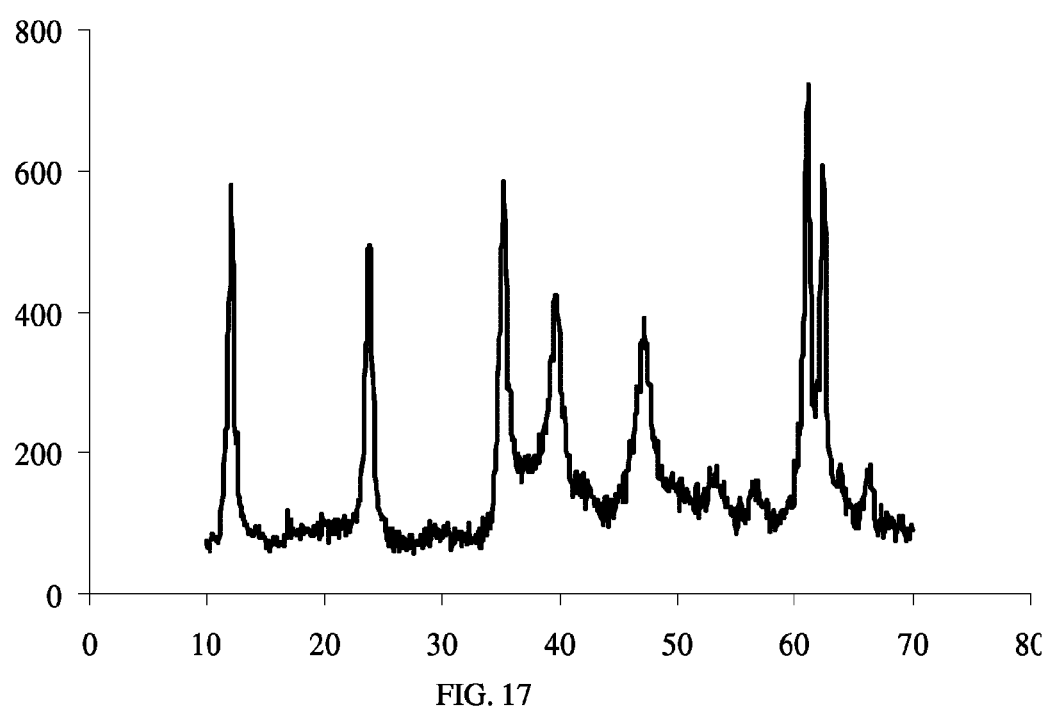
FIG. 17 is an X-ray diffraction (XRD) spectrum of a disclosed $Mg^{2+}$, $Al^{3+}$ mixed hydroxide species.

FIG. 14 is an XRD spectrum of the mixed carbonate species prior to calcining. The spectrum exhibits a series of peaks resulting from the lamellar structure of the mixed carbonate. FIG. 15 is an XRD spectrum of the mixed carbonate species after calcining. The XRD spectrum indicates that the lamellar structure of the carbonate was removed and indicates the formation of a mixed-oxide material. FIG. 16 is an SEM image of the mixed-oxide material with a Energy Dispersive Electron (EDX) spectrum inset showing the atomic percentages of magnesium, aluminum, and oxygen in the material. The atomic percentages give a ratio of Mg:Al of 2.07. FIG. 17 is an XRD spectrum of the $Mg_4Al_2(OH)_{12}CO_3.3H_2O$ material. The spectrum is in accordance with prior literature results.

EXAMPLE 8

10 grams of canola oil, 1 gram of the mixed metal oxide precursor of quintinite ($Mg_4Al_2(OH)_{12}CO_3.3H_2O$) produced according to Example 7, and 10 grams of methanol were refluxed for 15 hours at 70° C. The resulting solution was centrifuged for 15 minutes at 5000 rpm. Methanol was added to the solution in a 1:1 ratio and the resulting layers were separated.

The top layer included methanol and glycerin. The bottom layer included the fatty acid ester biodiesel product and the catalyst. Methanol was removed by distillation from the top layer to yield a glycerin fraction. The biodiesel was separated from the catalyst by decantation. The catalyst was washed with methanol and hexane, centrifuged, and the solid catalyst separated from the solvents by centrifuging and decantation. The solid catalyst was then heating at 60° C. to regenerate the catalyst.

Figure 18:
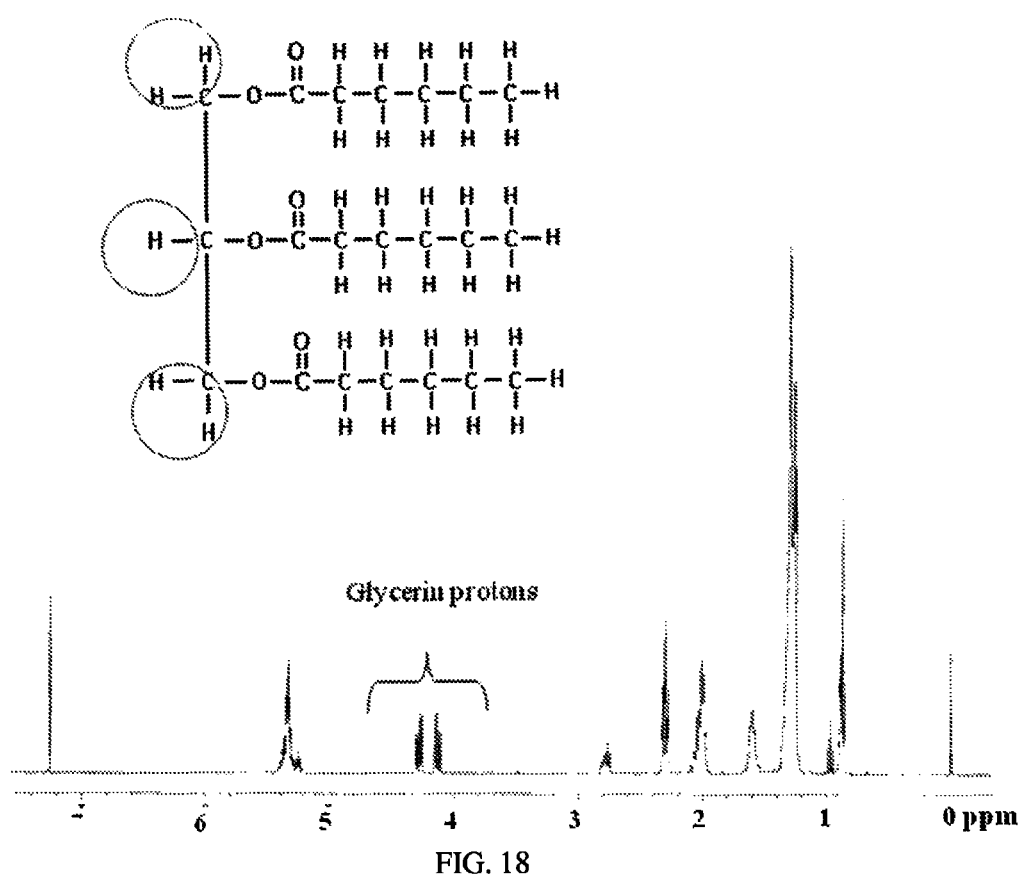
FIG. 18 is a proton NMR spectrum of canola oil.
Figure 19:
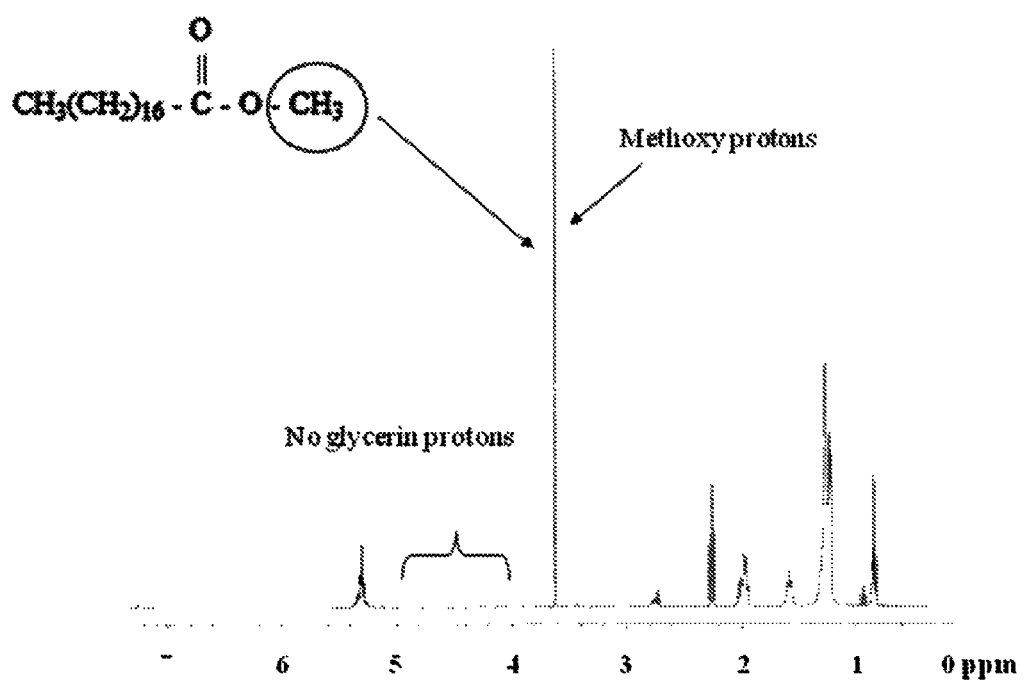
FIG. 19 is a proton NMR spectrum of a fatty acid ester material produced from the oil of FIG. 18 using a disclosed catalyst.
Figure 20:
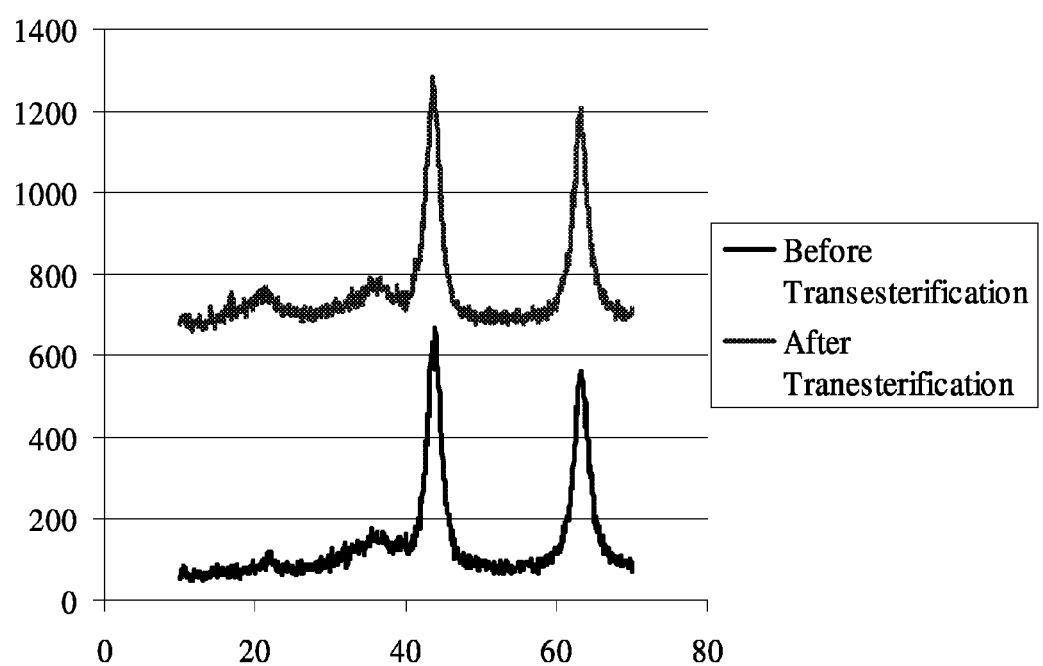
FIG. 20 is an X-ray diffraction (XRD) spectrum of the mixed oxide material of FIG. 15 before and after being used to transesterify the oil of FIG. 18.

FIG. 18 is a proton NMR spectrum of the canola oil sample illustrating the location of the hydrogen atoms of the glycerin moiety. FIG. 19 is a proton NMR spectrum of the fatty acid ester resulting from the transesterification. No signal was observed corresponding to the glycerin hydrogen atoms, while a new peak was observed and assigned to the methoxy hydrogen atoms. These results indicate that the oil was quantitatively transesterified. FIG. 20 present XRD spectra of the mixed-oxide material before and after being used in the transesterification reaction (the upper spectrum being offset on the y-axis), illustrating that the oxide material was unchanged by the reaction, as expected for it acting as a catalyst. A sample of the fatty acid ester material was subjected to standard biodiesel ASTM tests, the results of which are presented in the table below.

| Test Name | Test Method | Limit | Result |
|---|---|---|---|
| Free Glycerin (mass %) | ASTM D 6584 | MAX 0.020 | 0.006 |
| Monoglycerides (mass %) | ASTM D 6584 | N/A | 0.076 |
| Diglycerides (mass %) | ASTM D 6584 | N/A | 0.027 |
| Triglycerides (mass %) | ASTM D 6584 | N/A | 0.000 |
| Total Glycerin (mass %) | ASTM D 93 | MAX 0.240 | 0.109 |
| Phosphorous (ppm) | ASTM D 4951 | MAX 10 | 2 |
| Ca + Mg (ppm) | EN 14538 | MAX 5 | 2 |
| Na + K (ppm) | EN 15438 | MAX 5 | 2 |
| Viscosity @ 40° C. | ASTM D 445 | 1.9-6.0 | 5.84 |
| TAN (mg KOH/g) | ASTM D 664 | MAX 0.50 | 0.35 |
| Oxidation Stability by Rancimat (hours) | EN 14112 | MIN 3.00 | 3.05 |
| Cloud Point (° C.) | ASTM D 2500 | N/A | 11 |
| Pour Point (° C.) | ASTM D 97 | N/A | 2 |

It is to be understood that the above discussion provides a detailed description of various embodiments. The above descriptions will enable those skilled in the art to make many departures from the particular examples described above to provide apparatuses constructed in accordance with the present disclosure. The embodiments are illustrative, and not intended to limit the scope of the present disclosure. The scope of the present disclosure is rather to be determined by the scope of the claims as issued and equivalents thereto.

We claim:

1. A method for producing a biofuel comprising: extracting triglycerides from spent roasted coffee grounds; and transesterifying the triglycerides.

2. The method of claim 1, wherein the transesterifying the triglycerides is performed using a lower alkyl alcohol.

3. The method of claim 1, wherein the transesterifying the triglycerides is performed using methanol.

4. The method of claim 1, wherein the triglycerides are extracted using an organic solvent.

5. The method of claim 1, wherein the fuel is stable for at least about 12 hours.

6. The method of claim 1, wherein the fuel is stable for at least about 24 hours.

7. The method of claim 1, wherein the fuel is stable for at least about 7 days.

8. The method of claim 1, wherein the fuel is stable for at least about 30 days.

9. The method of claim 1, wherein the fuel comprises at least about 5 wt % antioxidants.

10. The method of claim 1, wherein the triglycerides are extracted by dry distillation.

11. A biofuel mixture produced by mixing an amount of a fuel according to claim 1 with a second fuel.

12. The biofuel mixture of claim 11, wherein the mixture comprises at least about 5 wt % of the fuel according to claim 1.

13. The biofuel mixture of claim 11, wherein the mixture comprises at least about 10 wt % of the fuel according to claim 1.

14. The biofuel mixture of claim 11, wherein the second fuel comprises B20.

15. The biofuel mixture of claim 11, wherein the second fuel comprises a petroleum based fuel.

16. The biofuel mixture of claim 11, wherein the second fuel comprises diesel.

17. A biofuel produced according to the method of claim 1.

18. A method for producing a biofuel, comprising: roasting coffee beans to form roasted coffee beans; grinding the roasted coffee beans to form roasted coffee grounds; extracting the roasted coffee grounds with water to produce water extracted, spent roasted coffee grounds; extracting triglycerides from the water extracted, spent roasted coffee grounds; and transesterifying the triglycerides to produce the biofuel.

19. The method of claim 18 further comprising mixing the biofuel with a second fuel to produce a fuel mixture having a greater stability than the fuel, wherein the second fuel is a biodiesel fuel, a biodiesel fuel blend, or a petroleum fuel.

20. The method of claim 1, further comprising, prior to extracting triglycerides from spent roasted coffee grounds, obtaining the spent roasted coffee grounds from a plurality of sources; and transporting the spent roasted coffee grounds to a biofuel production facility.

21. The method of claim 20, wherein at least one of the plurality of sources is selected from a grocery store, a convenience store, a coffee shop, a business, a restaurant, and a residence.

* * * * *